(12) United States Patent
Finc

(10) Patent No.: US 11,564,008 B2
(45) Date of Patent: *Jan. 24, 2023

(54) METHODS AND APPARATUS FOR AUDIENCE MEASUREMENT AND DETERMINING INFRARED SIGNAL BASED ON SIGNATURE OF SYMBOL ALPHABET

(71) Applicant: The Nielsen Company (US), LLC, New York, NY (US)

(72) Inventor: Matjaž Finc, Izola (SI)

(73) Assignee: The Nielsen Company (US), LLC, New York, NY (US)

(*) Notice: Subject to any disclaimer, the term of this patent is extended or adjusted under 35 U.S.C. 154(b) by 85 days.

This patent is subject to a terminal disclaimer.

(21) Appl. No.: 17/144,960

(22) Filed: Jan. 8, 2021

(65) Prior Publication Data

US 2021/0204024 A1 Jul. 1, 2021

Related U.S. Application Data

(63) Continuation of application No. 16/239,013, filed on Jan. 3, 2019, now Pat. No. 10,893,326, which is a
(Continued)

(51) Int. Cl.
*H04N 21/442* (2011.01)
*G08C 23/04* (2006.01)
*H04N 21/422* (2011.01)

(52) U.S. Cl.
CPC ....... *H04N 21/44222* (2013.01); *G08C 23/04* (2013.01); *H04N 21/42221* (2013.01); *H04N 21/44218* (2013.01)

(58) Field of Classification Search
CPC ............ G08C 23/04; H04N 21/42221; H04N 21/44218; H04N 21/44222;
(Continued)

(56) References Cited

U.S. PATENT DOCUMENTS 7,047,326 B1 5/2006 Crosbie et al.
8,295,407 B2 10/2012 Hsu et al.
(Continued)

OTHER PUBLICATIONS

United States Patent and Trademark Office, "Notice of Allowance", issued in connection with U.S. Appl. No. 15/375,849, dated Sep. 28, 2018, 8 pages.
(Continued)

*Primary Examiner* — Rong Le
(74) *Attorney, Agent, or Firm* — Hanley, Flight & Zimmerman, LLC

(57) ABSTRACT

Systems, apparatus, articles of manufacture, and methods are disclosed for media monitoring and audience measurement. An example system includes a symbol alphabet meter to generate a query symbol alphabet based on captured data of an optical pulse stream, the optical pulse stream detected from a media remote control. The example system also includes a symbol alphabet matcher to apply a probability function to the query symbol alphabet and a reference symbol alphabet to determine a symbol alphabet matching probability, and determine a symbol alphabet match based on the symbol alphabet matching probability. In addition, the example system includes a key code detector to determine a key code based on the symbol alphabet match.

20 Claims, 26 Drawing Sheets

Related U.S. Application Data continuation of application No. 15/375,849, filed on Dec. 12, 2016, now Pat. No. 10,200,754.

(58) Field of Classification Search
CPC .......... H04N 21/4223; H04N 1/32144; H04N 1/32149; H04N 1/32154; H04N 1/32187; H04N 1/32192; H04N 1/32197; H04N 1/32203; H04N 1/32208; H04N 1/3232; H04N 1/32331; H04N 19/467; H04N 21/23892; H04N 21/233; H04N 21/4104; H04N 21/4113; H04N 21/4122; H04N 21/4131; H04N 21/4135; H04N 21/4147; H04N 21/4394; H04N 7/084; H04N 7/085; H04N 7/087; H04N 7/088; H04N 7/0881; H04N 1/00; H04N 1/00336; H04N 7/083; H04N 21/42201; H04N 21/44008; H04N 1/00381; H04N 1/00384; H04N 1/00395; H04N 1/00397; H04N 1/004; H04N 1/00403; H04N 21/475; H04N 21/4753; H04N 21/25875; H04N 21/4751; H04N 21/42203; H04N 21/4402

See application file for complete search history.

(56) References Cited

U.S. PATENT DOCUMENTS

| | | |
|---|---|---|
| 10,200,754 B2 | 2/2019 | Finc |
| 10,893,326 B2 | 1/2021 | Finc |
| 2006/0274872 A1 | 12/2006 | Ikeda et al. |
| 2009/0024865 A1 | 1/2009 | Fugaro et al. |
| 2009/0138903 A1 | 5/2009 | Blanchard et al. |
| 2014/0344844 A1 | 11/2014 | Wright et al. |
| 2015/0263806 A1 | 9/2015 | Puscasu et al. |
| 2017/0171597 A1 | 6/2017 | Greene |

OTHER PUBLICATIONS

United States Patent and Trademark Office, "Final Office action", issued in connection with U.S. Appl. No. 15/375,849, dated Jun. 29, 2018, 20 pages.

United States Patent and Trademark Office, "Non-Final Office action", issued in connection with U.S. Appl. No. 15/375,849, dated Feb. 22, 2018, 18 pages.

United States Patent and Trademark Office, "Notice of Allowance", issued in connection with U.S. Appl. No. 16/239,013, dated Oct. 30, 2020, 9 pages.

United States Patent and Trademark Office, "Notice of Allowance", issued in connection with U.S. Appl. No. 16/239,013, dated Sep. 8, 2020, 8 pages.

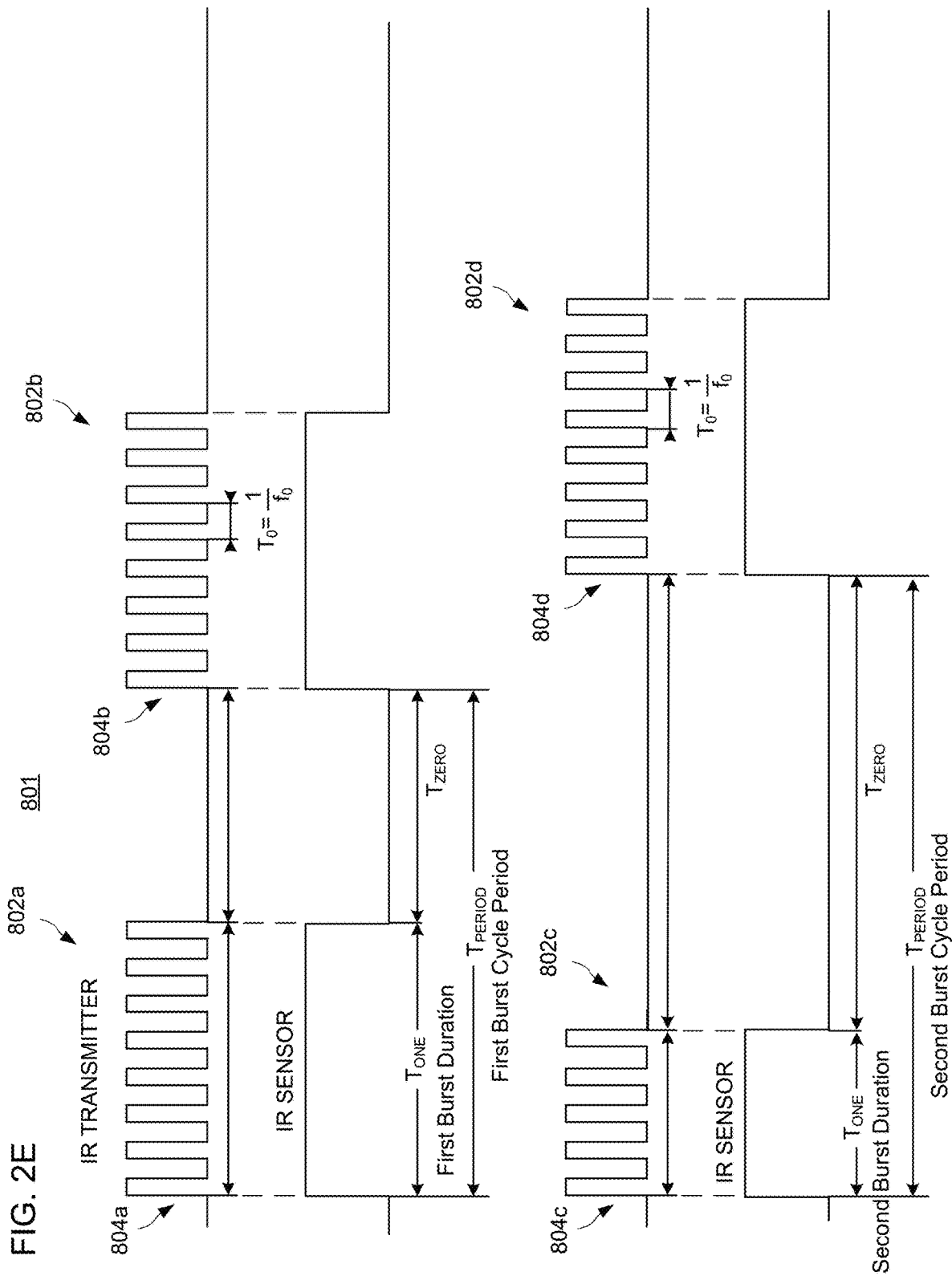

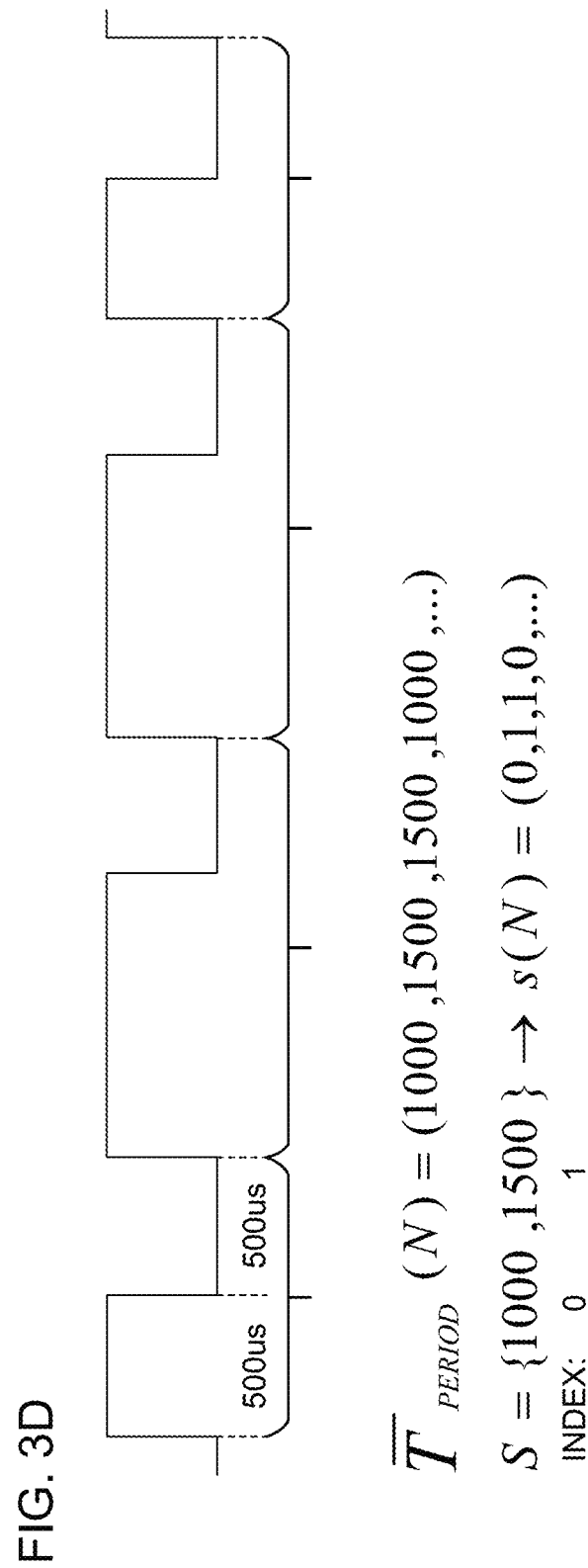

FIG. 3E

| KEY | QUERY SYMBOL DISTRIBUTION | QUERY SYMBOL ALPHABET (SCALED) |
|---|---|---|
| 5 | 13063321715000400 | 0A, 27, 2C, 37, 3D, 42, 5D, 78, FF |
| 6 | 13063321715000400 | 0A, 27, 2C, 37, 3D, 47, 58, 79, FF |
| 7 | 13063321715000400 | 0A, 27, 2C, 37, 3D, 4D, 53, 78, FF |
| | DIFFERENCE: | XX, XX, XX, XX, XX, >4, >4, XX, XX |

FIG. 4B

| HEADING AND FIRST SIGNATURE QUERY TIMESTAMP | SIGNATURE TYPE | SAMPLING RATE | SENSOR INDEX | FIRST SIGNATURE MSEC | FIRST SIGNATURE SLOT IDX | FIRST SIGNATURE BYTES | SECOND SIGNATURE MSEC | SECOND SIGNATURE SLOT IDX | SECOND SIGNATURE BYTES |
|---|---|---|---|---|---|---|---|---|---|

FIG. 4C

| SIGNATURE | 23180A272C373D425D78FF130633217150004000 | 20 |
|---|---|---|
| Optical Pulse Stream Captured Data | 1C0137031C01CE040201C802FE00CA0AFE00ED04FD00ED04FE006304FE005503FE00B732061 4D03FD002108FD00CC02FE00CC02FE00CC02FE00CC02FD007705FD00CC02FE00CC02FD00 2FD00 | 70 |

| | | SIZE (BYTES) |

FIG. 5D $$P = \begin{cases} d_{max} < 4 : P = 1 \\ 4 \leq d_{max} \leq 7 : P = K_p[i_{max}] \cdot \left(1 - \frac{\sum_{i=0}^{i_{max}} count(d[n] = i + 4) \cdot k(i_{max} - i)}{N}\right) \\ d_{max} > 7 : P = 0 \end{cases}$$

| KEY | Symbol Alphabet Symbol Difference | Symbol Alphabet P (%) |
|---|---|---|
| 5 | 00,00,00,00,00,00,00,00 | 100 |
| 6 | 00,00,00,00,00,06,05,00,00 | 22 |
| 7 | 00,00,00,00,00,0B,0B,01,00 | 0 |

FIG. 5E

| KEY | Signature Symbol Difference | Signature P (%) |
|---|---|---|
| 4 | 2,1,2,1,2,1,2,1,2,2,1,2,1,2,0,2,1,2,0,2,4,2,7,2,1,2,1,2,1,2,4,2,1,2,1,2 | 12 |
| 5 | 2,1,2,1,2,1,2,1,2,2,2,1,2,1,2,0,2,1,2,0,2,4,2,1,2,1,2,1,2,1,2,1,2,1,2 | 99 |
| 6 | 2,1,2,1,2,1,2,2,2,1,2,1,2,0,2,1,2,0,2,4,2,4,2,1,2,1,2,1,2,6,2,1,2,1,2 | 24 |

FIG. 5F

METHODS AND APPARATUS FOR AUDIENCE MEASUREMENT AND DETERMINING INFRARED SIGNAL BASED ON SIGNATURE OF SYMBOL ALPHABET

RELATED APPLICATION

This patent arises from a continuation of U.S. patent application Ser. No. 16/239,013, (now U.S. Pat. No. 10,893, 326) which was filed on Jan. 3, 2019, which arises from a continuation of U.S. patent application Ser. No. 15/375,849, (now U.S. Pat. No. 10,200,754) which was filed on Dec. 12, 2016. U.S. patent application Ser. No. 16/239,013 and U.S. patent application Ser. No. 15/375,849 are hereby incorporated herein by reference in their entireties. Priority to U.S. patent application Ser. No. 16/239,013 and U.S. patent application Ser. No. 15/375,849 is hereby claimed.

FIELD OF THE DISCLOSURE

This disclosure relates generally to audience measurement, and, more particularly, to determining an infrared signal based on signature of a symbol alphabet.

BACKGROUND

Audience measurement of media, such as content, advertisements, etc. presented via television, is often carried out by monitoring media exposure of panelists who are statistically selected to represent particular demographic groups. Audience measurement companies, such as The Nielsen Company (US), LLC, enroll households and/or persons to participate in measurement panels. By enrolling in these measurement panels, the households and/or persons agree to allow the corresponding audience measurement company to monitor their exposure to media presentations, such as media output via television. For example, audience media exposure may be a factor in the placement of advertisements, in valuing commercial time slots during particular programs and/or generating ratings for media.

BRIEF DESCRIPTION OF THE DRAWINGS

FIG. 2E shows timing diagrams of captured data of the optical sensor and the Optical Pulse Stream from the Media Remote Control of FIGS. 2A and 2B.

FIG. 3D illustrates an example of the Symbol Alphabet Meter extracting the Query Symbol Alphabet and the Symbol Distribution Meter composing the Query Symbol Distribution.

FIG. 3E shows an example comparison of corresponding Query Symbol Distributions and Query Symbol Alphabets for different Key Codes.

FIG. 4B is message diagram illustrating an example message encoding of the example Query Optical Pulse Signature and the example Query Timestamp by the example Signature Generator shown in FIG. 4A.

FIG. 4C illustrates an example Query Optical Pulse Signature relative to example Optical Pulse Stream Captured Data.

FIG. 5D shows an expression of a probability calculation model that can be implemented in the Symbol Alphabet Matcher shown in FIG. 5C.

FIGS. 5E and 5F illustrate aspects of operation in the context of symbol alphabet matching by example Symbol Alphabet Matcher of FIG. 5C and in the context of key code detection by example key code detector of FIG. 2B.

DETAILED DESCRIPTION

Figure 1A:
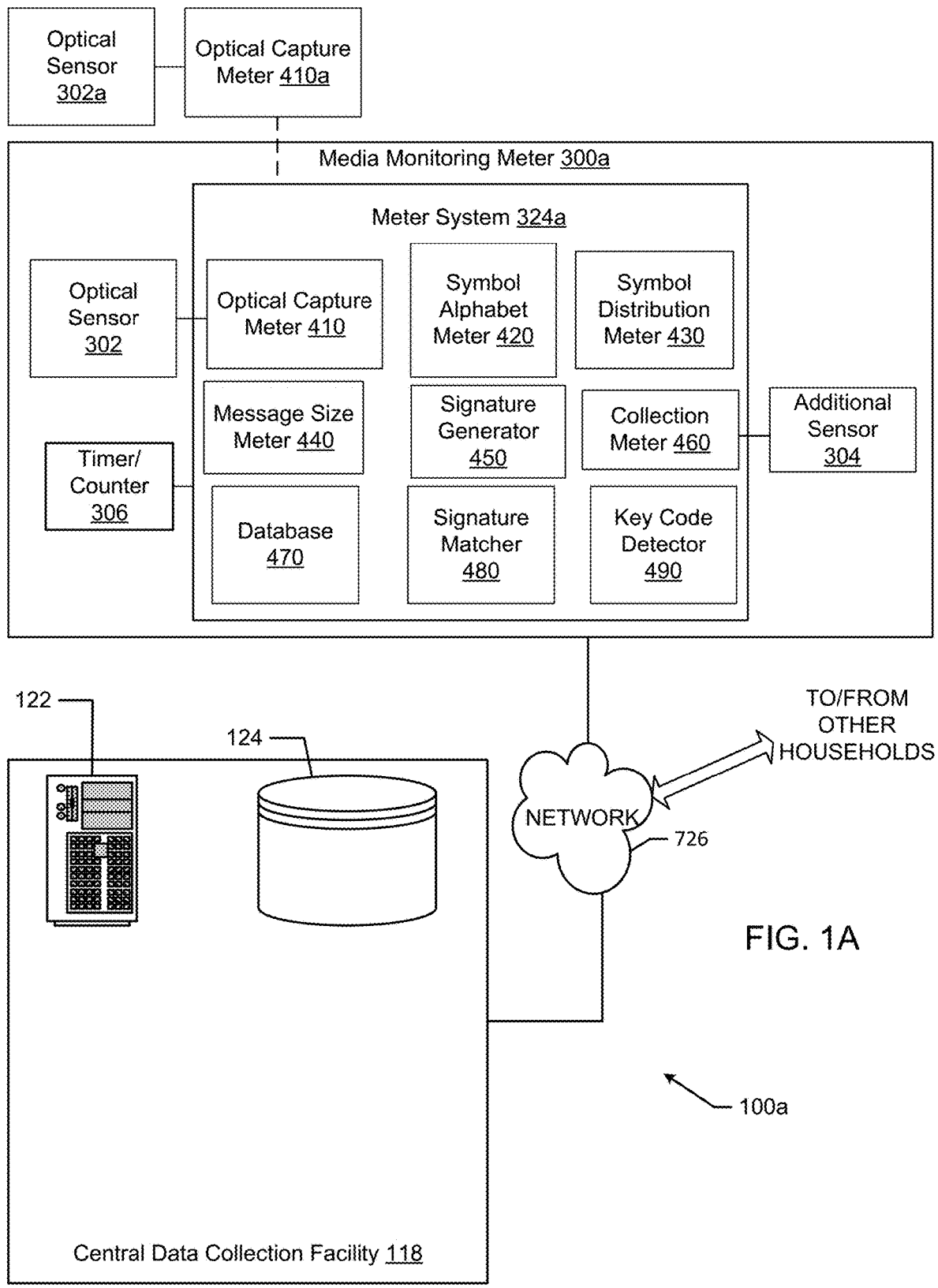
FIGS. 1A and 1B are block diagrams showing examples of media monitoring meter systems.
Figure 1B:
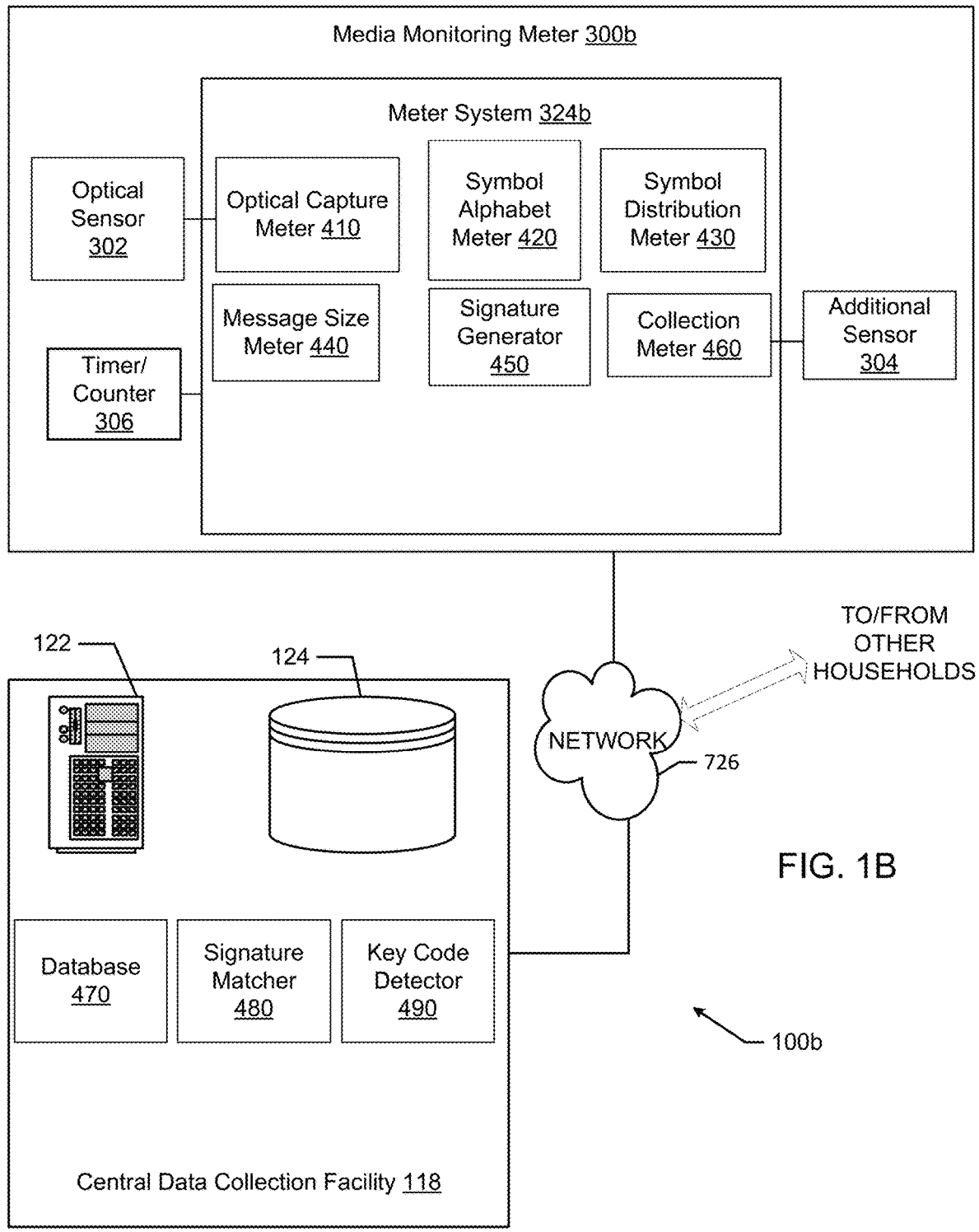

Audience measurement systems can benefit from ongoing input from the participating audience member. Viewer input can be collected from example media monitoring meter systems 100a, 100b as shown in FIGS. 1A and 1B. The media monitoring meter systems 100a, 100b include an electronic device, e.g., media monitoring meter 300a, 300b that is typically disposed in the viewing area and that is proximate to one or more of the viewers. The media monitoring meter systems 100a, 100b are adapted to measure various signals associated with the television for a variety of purposes including, but not limited to, determining the operational status of the television, i.e., whether the television is off or on, identifying the programming being displayed by the television and detecting a media source change (e.g., switching from watching the same television channel to a different media source, such as switching form terrestrial broadcast to satellite broadcast.) For example, it is desired to collect information about a television channel change by activation of a key on an infrared television remote control. The television channel change can correspond to an audience viewer's lack of interest in current media programming or commercial displayed through a current television channel and/or an audience viewer's relatively higher level of interest in alternative media programming or commercial for display through an alternative television channel.

Problems overcome by the teachings of this disclosure relate to uncertainty over media remote controls, for example, being sourced from various different manufacturers and employing various different infrared signaling protocols to control media activity (e.g., changing television channels.) These problems can become all the more challenging because arrangements of media remote controls, television set-top boxes and the like may be frequently upgraded. This may lead to even more changes and uncertainty in infrared signaling protocols of media remote controls. Despite these changes and their uncertainty, there is a continuing need for consistent and accurate collection of information about television channel change by activation of the key on the infrared television remote control, without complete reliance on, or complete prior knowledge of, the various different remote control infrared signaling protocols. Indeed, any such complete reliance may be misplaced when media remote controls are changed and/or upgraded.

The teachings of this disclosure can address the continuing need for consistent and accurate collection of information about control of media activities (e.g., television channel change) by activation of the key on the infrared television remote control. The teachings of this disclosure can provide a generalized way of key code detection of media remote controls from various different manufacturers without complete prior knowledge and/or implementations of various different media remote control infrared signaling protocols employed by various media remote controls. Advantageously, because the teachings of this disclosure need not rely on complete prior knowledge and/or implementations of infrared signaling protocols employed by media remote controls, the more generalized approach undertaken using the teachings of this disclosure can adapt to upgrades and/or changes in arrangements of media remote controls, television set-top boxes and the like, while continuing to provide consistent and accurate collection of information about control of media activities, e.g. television channel changes.

As shown in FIGS. 1A and 1B, a key code detector 490 of example media monitoring meter systems 100a, 100b can determine a key code, based on a query optical pulse signature including a query symbol alphabet. The key code corresponds to the key activated on the media remote control to control a media activity (e.g., changing television channels.) The foregoing can provide a generalized way of key code detection of media remote controls from various different manufacturers without complete prior knowledge and/or implementations of various different remote infrared signal protocols employed by various different media remote controls.

FIGS. 1A and 1B are block diagrams showing examples of media monitoring meter systems 100a, 100b. In the examples of FIGS. 1A and 1B, the example media monitoring meter systems 100a, 100b include respective media monitoring meters 300a. The media monitoring meters 300a, 300b include respective optical sensor 302 for sensing the optical pulse stream from the media remote control, respective additional sensor 304 for sensing a media signature of the media activity (e.g., an audio additional sensor for sensing audio frequencies of an audio watermark of a media signature), and respective timer/counter 306 for use in generating timestamps (e.g., a query timestamp and a media signature timestamp.)

In the examples of FIGS. 1A and 1B, the media monitoring meters 300a, 300b include respective meter system 324a, 324b. The meter system 324a, 324b includes respective optical capture meter 410 coupled with the respective optical sensor 302 to capture data of an optical pulse stream detected from a media remote control. The respective optical capture meter 410 can associate the optical pulse stream captured data with the query timestamp. The optical capture meter 410 and/or optical sensor 302 can be disposed within a housing along with other components of the media monitoring meters 300a, 300b. Alternatively, or additionally the optical capture meter 410 and/or optical sensor 302 can be arranged externally and coupled with other components of the media monitoring meters 300a, 300b via a wired connection or coupled wirelessly. For example, alternative optical capture meter 410a and alternative optical sensor 302a can be coupled wirelessly with other components of the media monitoring meter 300a, as depicted in FIG. 1A using a dashed line to show the wireless coupling. The meter system 324a, 324b includes respective collection meter 460 coupled with the additional sensor 304 to collect media signature data from the media activity controlled by the key activated on the media remote control. The collection meter 460 can associate the media signature data with the media signature timestamp.

In the examples of FIGS. 1A and 1B, the respective meter system 324a, 324b includes respective symbol alphabet meter 420, respective symbol distribution meter 430, respective message size meter 440, and respective signature generator 450. The respective symbol alphabet meter 420 is to generate a query symbol alphabet from the optical pulse stream captured data. Similarly, the respective symbol distribution meter 430 is to generate a query symbol distribution from the optical pulse stream captured data. Similarly, the respective message size meter 440 is to generate a query message size from the optical pulse stream captured data.

In the examples of FIGS. 1A and 1B, the respective meter system 324a, 324b includes respective signature generator 450 to generate a query optical pulse signature based on the query symbol alphabet 156a, the query symbol distribution 158a and the query message size 159a. The signature generator 450 can associate the query optical pulse signature with the query timestamp.

In the example media monitoring meter systems 100a, 100b of FIGS. 1A and 1B the media monitoring meter 300a, 300b can be a primary source to collect in-home viewing data. The media monitoring meter 300a can communicate with a remotely located central data collection facility 118 via a network 726. The central data collection facility 118 can also collect in-home viewing data from other households. The central data collection facility 118 includes a central server 122 and a central database 124 to receive, process and/or store in-home viewing data collected from households over the network 726.

In the example media monitoring meter system 100a of FIG. 1A the meter monitoring meter includes a database 470, a signature matcher 480, and the key code detector 490. The database includes a reference database. In addition to including reference optical pulse signatures and reference key codes, the reference database also includes associations between respective reference key codes and respective reference optical pulse signatures. The database can retrieve reference optical pulse signatures from the reference database for matching with the query optical pulse signatures. The signature matcher 480 can match reference optical pulse signatures from the reference database with the query optical pulse signatures to generate a signature match. The key code detector 490 can determine the key code corresponding to the key activated on the media remote control to control the media activity, based on the signature match and based on the associations between respective reference key codes and respective reference optical pulse signatures in the reference database of the database. In particular, the specific reference optical pulse signature corresponding to the signature match can be used by the database to search the reference database to find the specific key code associated with the specific reference optical pulse signature in the associations in the reference database.

Although the database 470, the signature matcher 480, and the key code detector 490 are shown in the example of FIG. 1A as being disposed in the example media monitoring meter 300*a* of the example media monitoring meter system 100*a*, in other examples the network 726 can facilitate distributed processing using other equipment and/or locations. For example, the database 470, the signature matcher 480, and the key code detector 490 are shown in the example of FIG. 1B as being disposed in the central data collection facility 118, and associated with the central server 122 and the central database 124. There are respective advantages and/or benefits as among the media monitoring meter system 100*a* shown in the example of FIG. 1A and the media monitoring meter system 100*b* shown in the example of FIG. 1B. The media monitoring meter system 100*a* shown in the example of FIG. 1A can process relatively more data locally with relatively less remote movement of the data to be processed. The media monitoring meter system 100*b* shown in the example of FIG. 1B may muster relatively more processing power for processing data at the central data collection facility 118 than may be otherwise available in households. Also, relatively more centralized maintenance and/or updating of the Database 470, the signature matcher 480, and the key code detector 490 may be done at the central data collection facility 118, in the example media monitoring meter system 100*b* shown in the example of FIG. 1B.

Figure 1C:
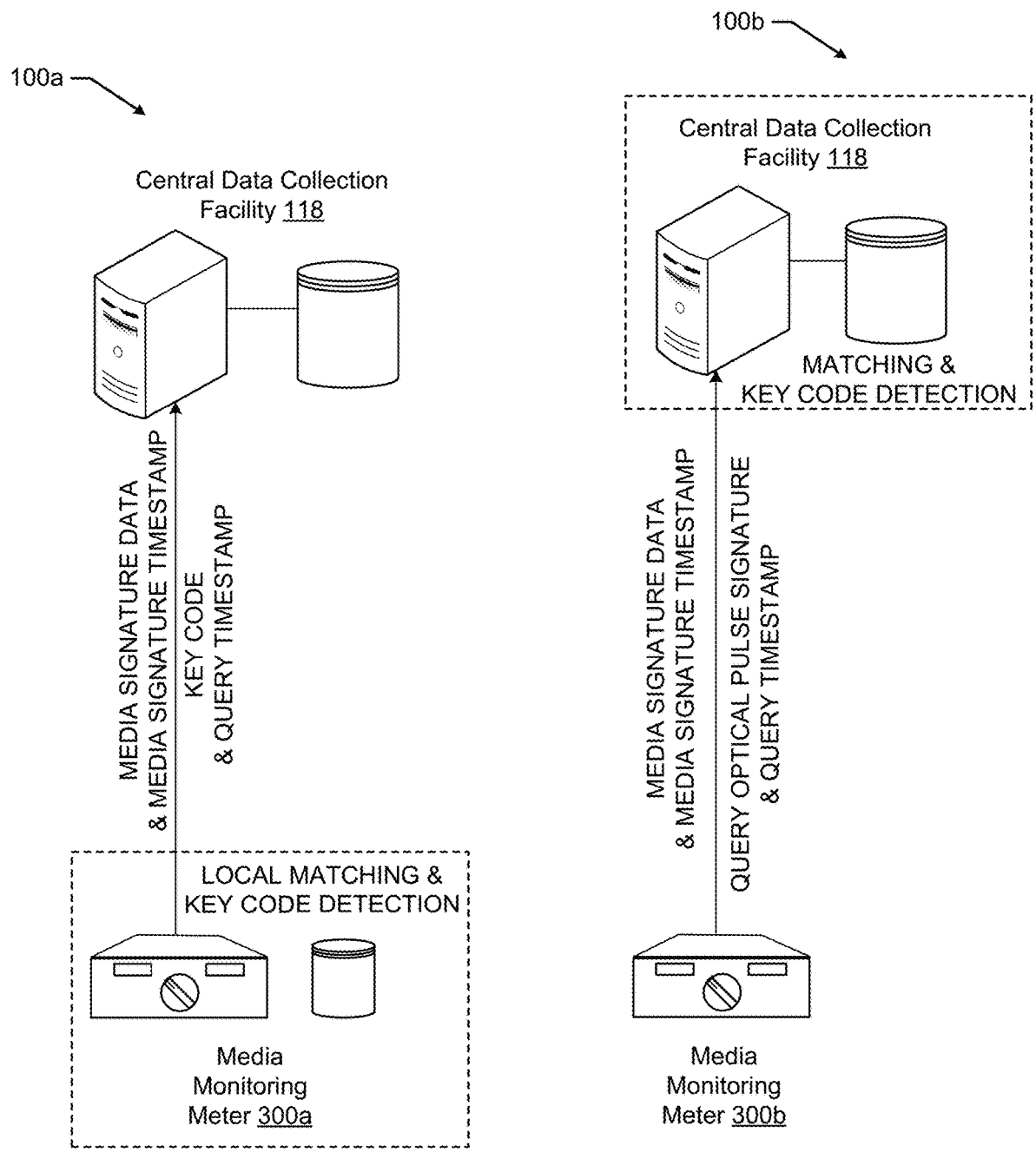
FIG. 1C is a diagram illustrating matching and transmissions in the context of operating example media monitoring meter systems shown in FIGS. 1A and 1B.

As further illustration of the foregoing, FIG. 1C is a diagram illustrating matching and transmissions in the context of operating example media monitoring meter systems 100*a*, 100*b* shown in FIGS. 1A and 1B. On the left of the diagram of FIG. 1C is shown example media monitoring meter 300*a*, wherein, as just discussed, the database, the signature matcher, and the key code detector can be disposed in the example media monitoring meter 300*a* of the example media monitoring meter system 100*a* for the local matching and key code detection at the household, as just discussed. After the local matching and key code detection, the media monitoring meter 300*a* can transmit the key code and its associated query timestamp to the central data collection facility 118 as shown on the left side of the diagram of FIG. 1C. The media monitoring meter 300*a* can also transmit to the central data collection facility 118 the media signature data from the media activity controlled by the key activated on the media remote control corresponding to the key code, as shown on the left side of the diagram of FIG. 1C. The media signature timestamp associated with the media signature data can also be transmitted to the central data collection facility 118 along with the media signature data, as shown on the left side of the diagram of FIG. 1C.

In contrast to what was just discussed, on the right of the diagram of FIG. 1C is shown example media monitoring meter 300*b*, wherein, as was discussed earlier, the database, the signature matcher, and the key code detector can be disposed in the example central data collection facility 118 of the example media monitoring meter system 100*a* for the remote and/or centralized matching and key code detection at the central data collection facility 118, as discussed previously. After the locally generating query optical pulse signature, the media monitoring meter 300*b* can transmit the query optical pulse signature and its associated query timestamp to the central data collection facility 118 as shown on the right side of the diagram of FIG. 1C. The media monitoring meter 300*b* can also transmit to the central data collection facility 118 the media signature data from the media activity controlled by the key activated on the media remote control corresponding to the key code to be detected by the central data collection facility 118, as shown on the right side of the diagram of FIG. 1C. the media signature timestamp associated with the media signature data can also be transmitted to the central data collection facility 118 along with the media signature data, as shown on the right side of the diagram of FIG. 1C.

Figure 2A:
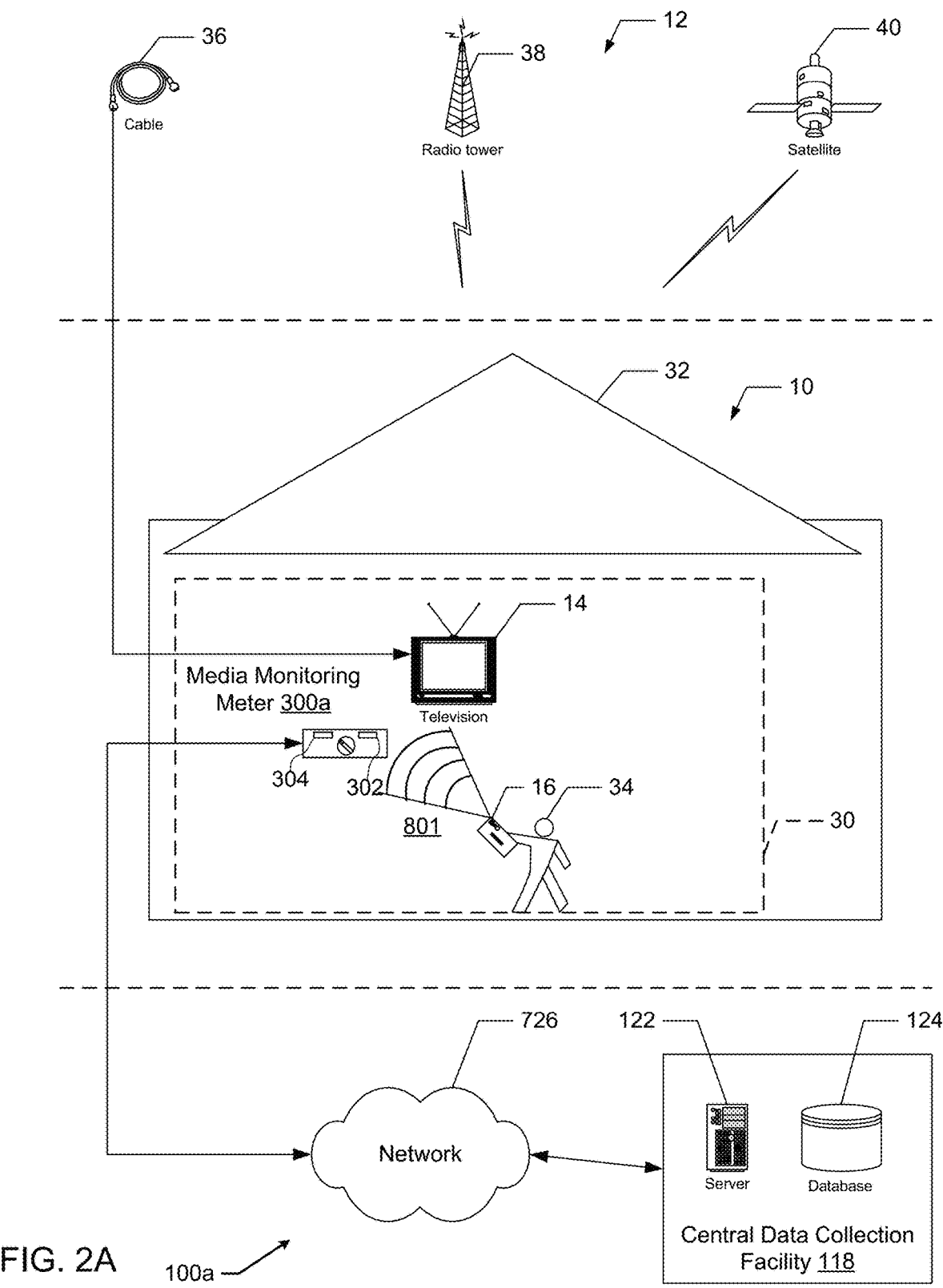
FIG. 2A is a block diagram of an example television system in the context of operating the example media monitoring meter system and example media monitoring meter shown in FIG. 1A.

FIG. 2A is a block diagram of an example television system in the context of operating the example media monitoring meter system 100*a* and example media monitoring meter 300*a* shown in FIG. 1A. The teachings to be discussed are likewise applicable to operating the example media monitoring meter system 100*b* and media monitoring meter 300*b* shown in FIG. 1B. In the example of FIG. 2A, an example television system 10 including a television service provider 12, a television 14, and a media remote control 16 is metered using the media monitoring meter system 100*a* including media monitoring meter 300*a*. The components of the television system 10 may be coupled in any well-known manner, such as that shown in FIG. 2A. The television 14 can be positioned in a viewing area 30 located within a house 32 occupied by one or more people, referred to as household members 34, all of whom have agreed to participate in an audience measurement research study. The viewing area 30 includes the area in which the television 14 is located and from which the television 14 may be viewed by one or more household members 34 located in the viewing area 30.

The media monitoring meter 300*a* and/or optical capture meter 410 and/or optical sensor 302, in various combinations, can be configured as portable or can be configured as primarily stationary and disposed on or near the television 14 and may be adapted to perform one or more of a variety of well-known television metering methods. Depending on the types of metering that the media monitoring meter 300*a* is adapted to perform, the media monitoring meter 300*a* may be physically coupled to the television 14 or may instead be configured to capture signals emitted externally by the television 14 such that direct physical coupling to the television 14 is not required. Preferably, the media monitoring meter 300*a* is provided for each television 14 disposed in the household 32, such that the base metering devices 20 may be adapted to capture data regarding all in-home viewing by the household members.

The media monitoring meter 300*a* can perform television metering using audio code capture techniques and/or audio signature capture techniques using the additional sensor 304 (e.g. audio sensor 304) coupled with the collection meter of the media monitoring meter 300*a*. The media monitoring meter 300*a* can capture audio code information and audio signature information simultaneously. Alternatively, the media monitoring meter 300a may be adapted to use the audio code techniques as a primary metering method and to use the audio signature metering method as a secondary method, i.e., to supplement the metering performed using the audio code technique. Specifically, if one or more audio codes are detected by the media monitoring meter 300a, then the audio signature method need not be performed. Conversely, if audio codes are not detected, then the media monitoring meter 300a may capture audio signature information of the programming content displayed on the television 14 for purposes of metering viewing. The media monitoring meter 300a may be adapted to capture and process audio codes that are embedded in the programming content using an encoding technique such as that disclosed in U.S. Pat. No. 6,968,564 entitled "Multi-Band Spectral Audio Encoding" by Srinivasan and issued Nov. 22, 2005, which is hereby incorporated herein by reference. Although the additional sensor 304 has been discussed in the context of audio codes and audio signatures, the additional sensor 304 is not limited to audio and can be used in television monitoring, more generally, by sensing television media.

The media monitoring meter 300a can communicate with the remotely located central data collection facility 118 via the network 726. The network 726 may be implemented using any type of public or private network such as, but not limited to, the Internet, a telephone network, a local area network (LAN), a cable network, and/or a wireless network. To enable communication via the network 726, the media monitoring meter 300a may include a communication interface that enables connection to an Ethernet, a digital subscriber line (DSL), a telephone line, a coaxial cable, or any wireless connection, etc. As will be appreciated by persons of ordinary skill in the art, the media monitoring meter 300a may be adapted to send viewing data to the central data collection facility 118. The central data collection facility 118 may include a central server 122 and a central database 124. Further, the central data collection facility 118 may be adapted to process and store data received from the media monitoring meter 300a. The media monitoring meter system 100a may be configured so that the media monitoring meter 300a is adapted to be the primary source to collect all in-home viewing data.

The television service provider 12 may be implemented using any television service provider 12 such as, but not limited to, a cable television service provider 36, a radio frequency (RF) television provider 38, and/or a satellite television service provider 40. The television 14 receives a plurality of television signals transmitted via a plurality of channels by the television service provider 12 and may be adapted to process and display television signals provided in any format such as an National Television Standards Committee (NTSC) television signal format, a high definition television (HDTV) signal format, an Advanced Television Systems Committee (ATSC) television signal format, a phase alternation line (PAL) television signal format, a digital video broadcasting (DVB) television signal format, an Association of Radio Industries and Businesses (ARIB) television signal format, etc. The processing performed by the television 14 may include, for example, extracting a video component delivered via the received signal and an audio component delivered via the received signal, causing the video component to be displayed on a screen/display associated with the television 14, and causing the audio component to be emitted by speakers associated with the television. The programming content contained in the television signal may include, for example, a television program, a movie, an advertisement, a video game, and/or a preview of other programming that is or will be offered by the television service provider 12 now or in the future.

The user activates the key on the media remote control 16 (corresponding to the key code) to generate the optical pulse stream 801 to be received by the television 14, to allow the user to control the media activity, e.g., to cause the television 14 (and/or associated set-top box) to tune to and receive signals transmitted on a desired channel, and to cause the television 14 to process and present the programming content contained in the signals transmitted on the desired channel. The television 14 (and/or associated set-top box) has complete prior knowledge and/or implementation of the infrared signaling protocol employed by the media remote control 16 in generating the optical pulse stream 801 to be received by the television 14. The television 14 (and/or associated set-top box) uses its implementation of the infrared signaling protocol employed by the media remote control 16 to determine the key code of the activated key of the media remote 16, to allow the user to control the media activity.

As shown in FIG. 2A, when the user activates the key on the media remote control 16 (corresponding to the key code) to generate the optical pulse stream 801 to be received by the television 14 to control the media activity, the media monitoring meter 300a is arranged proximate to the television 14, so that the optical sensor 302 of the media monitoring meter 300a likewise receives the optical pulse stream 801 from the media remote control 16. The optical sensor 302 of the media monitoring meter 300a can sense the optical pulse stream 801 from the media remote control 16. The optical capture meter of the media monitoring meter 300a is coupled with the optical sensor 302 to capture data of an optical pulse stream 801 detected from the media remote control 16. In contrast to the specific implementation of the infrared signaling protocol employed by the media remote control 16 and by the television 14 (and/or set-top box), the media monitoring meter 300a provides a generalized way of key code detection from the optical pulse stream 801 of the media remote control 16, without complete prior knowledge and/or implementation of the infrared signaling protocol employed by the media remote control 16. Advantageously, because the teachings of this disclosure need not rely on complete prior knowledge and/or implementation of the infrared signaling protocol employed by media remote control 16, the more generalized approach undertaken using the teachings of this disclosure can adapt to upgrades and/or changes in arrangements of media remote control 16, television 14, television set-top boxes and the like, while continuing to provide consistent and accurate collection of information about control of media activities, e.g. television channel changes.

Figure 2B:
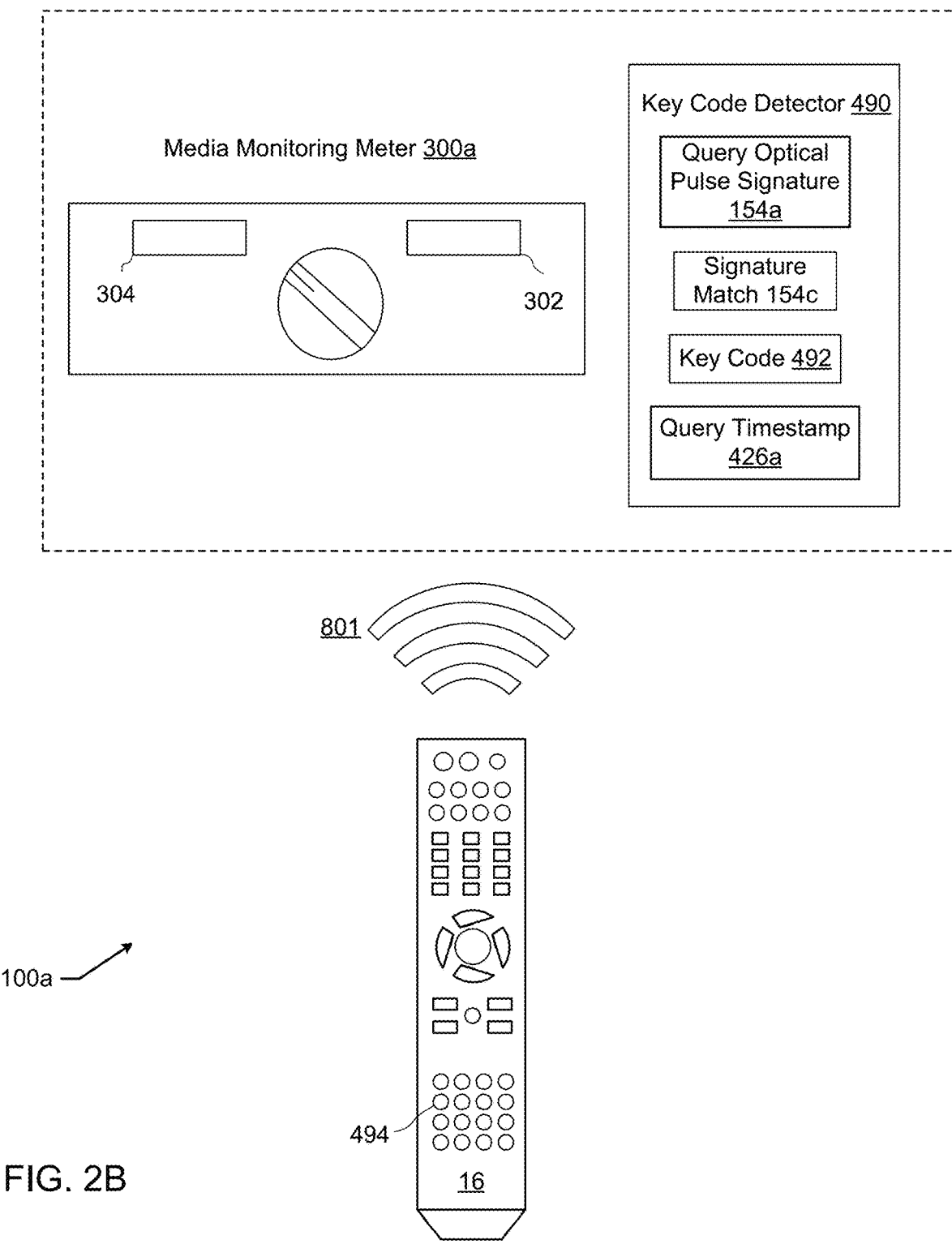
FIG. 2B is a more detailed view of the media monitoring meter and media remote control in the context of operating the media monitoring meter system of FIGS. 1A and 2A.

FIG. 2B is a more detailed view of the media monitoring meter and media remote control in the context of operating the media monitoring meter system 100a of FIGS. 1A and 2A. The teachings to be discussed can be adapted to operating the example media monitoring meter system 100b and media monitoring meter 300b shown in FIG. 1B. In the detailed view of FIG. 2B, when the user activates the key 494 on the media remote control 16 (corresponding to the key code 492) to generate the optical pulse stream 801 to be received by the television to control the media activity, the media monitoring meter 300a is arranged proximate to the television 14, so that the optical sensor 302 of the media monitoring meter 300a likewise receives the optical pulse stream 801 from the media remote control 16.

As shown in detail in the example of FIG. 2B, the optical sensor 302 of the media monitoring meter 300a can sense the optical pulse stream 801 from the media remote control 16. The optical capture meter of the media monitoring meter 300a is coupled with the optical sensor 302 to capture data of the optical pulse stream 801 detected from the media remote control 16. The signature generator of the media monitoring meter 300a can generate the query optical pulse signature 154a based on the captured data from the optical pulse stream 801. The key code detector 490 of the media monitoring meter 300a can determine the key code 492, based on the query optical pulse signature 154a, including the query symbol alphabet 156a and including the query symbol distribution 158a and including the query message size 159a. More specifically, the key code detector 490 can determine the key code 492 corresponding to the key 494 activated on the media remote control 16 to control the media activity, based on the signature match 154c with the query optical pulse signature 154a and based on the associations between respective reference key codes and respective reference optical pulse signatures in the reference database of the database. As will be discussed in greater detail subsequently herein, the specific reference optical pulse signature corresponding to the signature match 154c can be used by the database to search the reference database to find the specific key code associated with the specific reference optical pulse signature in the associations in the reference database. The key code detector 490 can associate the query timestamp 426a with the key code 492.

Figure 2C:
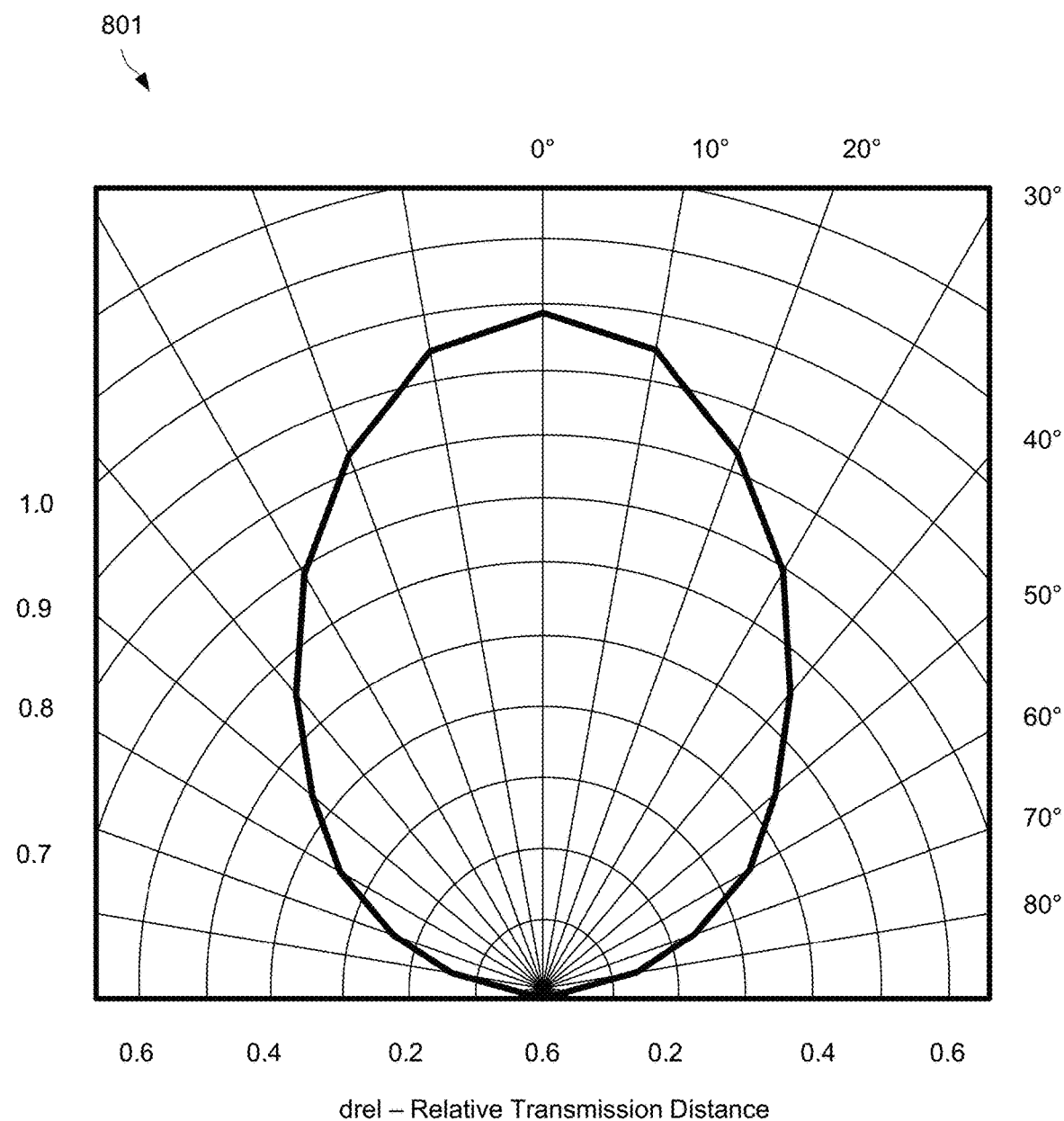
FIG. 2C is a diagram showing an example free space lobe radiation pattern of the optical pulse stream from the media remote control shown in FIGS. 2A and 2B.

FIG. 2C is a diagram showing an example free space lobe radiation pattern of the optical pulse stream 801 from the media remote control shown in FIGS. 2A and 2B. One factor that can impact the quality of reception the optical pulse stream 801 is the relative angle between the media remote control and the optical sensor. As shown in the diagram of FIG. 2C, the wider the angle between the media remote control and the optical sensor, the weaker the signal of the optical pulse stream 801 received by the optical sensor. The weaker the signal of the optical pulse stream 801 received by the optical sensor, the greater the relative influence of noise, and the greater the likelihood of errors being introduced in the captured data of the optical pulse stream 801. As will be discussed in greater detail subsequently herein, the query symbol alphabet generator can employ techniques such as thresholding techniques, quantizing techniques, and/or clustering techniques to generate the query symbol alphabet from the captured data of the optical pulse stream 801 despite errors that may be present in the capture data.

Figure 2D:
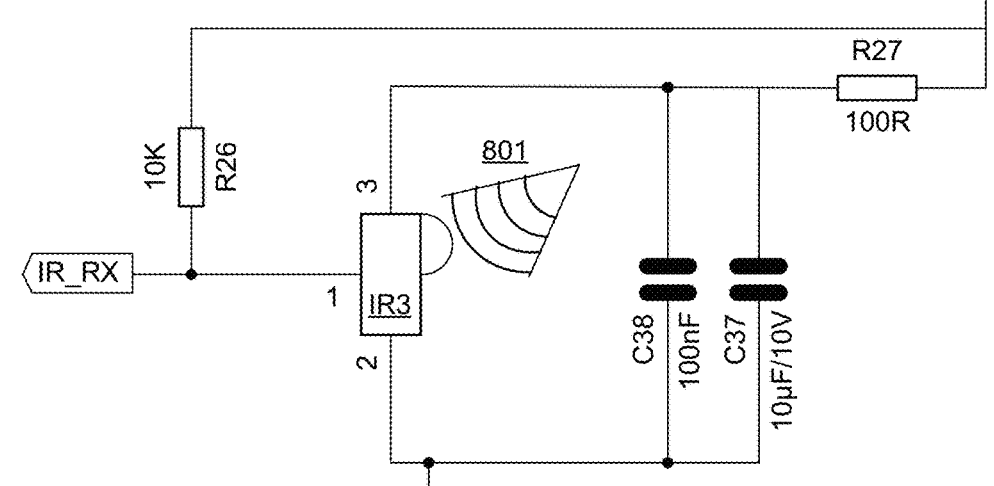
FIG. 2D is an example circuit diagram of an example first optical sensor of example media monitoring meter shown in FIGS. 1A, 2A and 2B.

FIG. 2D is an example circuit diagram of the example optical sensor 302 of the example media monitoring meter 300a shown in FIGS. 1A, 2A and 2B. The optical sensor teachings to be discussed are likewise applicable to the example media monitoring meter system 100b and media monitoring meter 300b shown in FIG. 1B. The example circuit of the optical sensor 302 can include an example suitable infrared detector and amplifier IR3 arranged to be illuminated by infrared optical radiation of the optical pulse stream 801. Suitable DC bias of example infrared detector and example amplifier IR3 can be provided by the example arrangement of resistor R27, Resistor R26, capacitor C38 and capacitor C37 shown in in FIG. 2D. A circuit signal output IR_RX of the circuit of optical sensor 302 can be connected to an interrupt pin of a main Central Processing Unit (CPU) of the media monitoring meter 300a. The CPU can measure, through a dedicated assembly language routine of the optical capture meter and its internal clock, burst durations and burst cycle periods of the optical pulse stream 801 to generate optical pulse stream captured data.

FIG. 2E shows timing diagrams of captured data of the optical sensor and the optical pulse stream 801 from the media remote control of FIGS. 2A and 2B. The optical sensor and optical capture meter can incorporate signal processing to convert the captured infrared light bursts of the optical pulse stream 801 into plain pulses as illustrated in FIG. 2E. Digital filters and automatic gain control (AGC) can clean up the coded signal of modulated pulses of infrared light and reduce the disturbances from the environment (e.g. fluorescent lamps). Although example implementations of the optical sensor have been discussed, the optical sensor is not limited to these example implementations and other implementations can, for example, do additional analog and/or digital signal processing in the optical sensor.

The optical pulse stream 801 includes a coded signal of modulated pulses of infrared light. On the physical layer, infrared light pulsed are transmitted as bursts of infrared light toggled at a predefined carrier frequency (f0) and period (T0) as illustrated in FIG. 2E. Data can be encoded in various ways at a data link layer, for example means of pulse burst durations (TONE) and pulse burst gaps (TZERO) i.e. pulse cessation durations. The most common carrier frequencies are in the range of 36 kHz to 56 kHz.

As shown in FIG. 2E, the optical pulse stream 801 includes a plurality of bursts 802a, 802b, 802c, 802d of optical pulses. The plurality of bursts 802a, 802b, 802c, 802d of optical pulses have respective burst cycle periods between corresponding extremities of adjacent bursts. For example FIG. 2E shows a first burst cycle period TPeriod between respective corresponding extremities 804a, 804b of first and second adjacent bursts 802a, 802b. For example FIG. 2E shows a second burst cycle period TPeriod between respective corresponding extremities 804c, 804d of third and fourth adjacent bursts 802c, 802d. As shown in FIG. 2E, due to the coded signal of modulated pulses of the infrared light, the burst durations and burst cycle periods will vary. For example, in FIG. 2E, the second burst cycle period is shown as longer than the first burst cycle period. For example, in FIG. 2E, the second burst duration is shown as shorter than the first duration. The optical capture meter is to determine the respective burst cycle periods (e.g. first and second burst periods) between corresponding extremities 804a and 804b, 804c and 804d of adjacent bursts 802a and 802b, 802c and 802d; and the optical capture meter is also to determine the respective burst durations (e.g. first and second burst durations) of the bursts the optical pulse stream 801, to facilitate reduction of jitter in capturing the captured data.

Jitter represents scattered variations in sensor's response (analogous to AC component). However, jitter testing can vary for different sensors. For example, testing an example 38 kHz sensor indicates that, in general, the example 38 kHz sensor can be prone to produce jitter up to ±50 microseconds. In practice, jitter can be distributed in steps of approximately T0. Another important teaching of this disclosure is that the burst cycle periods (TPERIOD) are much less prone to jitter than pulse burst durations (TONE) and pulse burst gaps (TZERO). Due to a large number of possible conditions, it is not feasible to fully and accurately quantify jitter even under the most common scenarios. However, it the teaching of this disclosure that the optical capture meter is to determine both the respective burst cycle periods between corresponding extremities of adjacent bursts, and the respective burst durations of the bursts the optical pulse stream, to facilitate reduction of jitter in capturing the captured data.

Figure 2F:
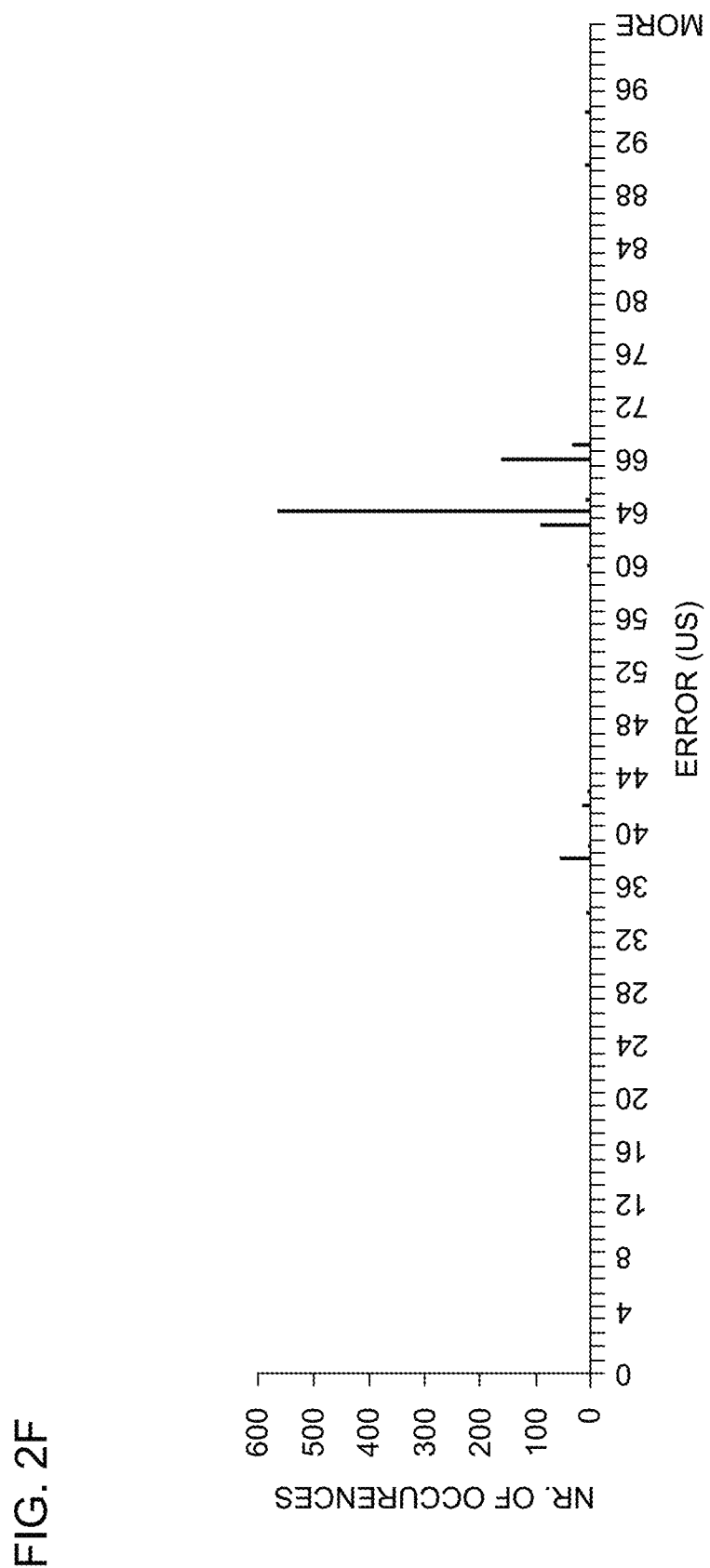
FIG. 2F is an error diagram based on measurements of burst durations and burst cessation durations of the optical pulse stream from the media remote control shown in FIGS. 2A and 2B.

FIG. 2F is an error diagram based on measurements of burst durations and burst cessation durations of the optical pulse stream from the media remote control shown in FIGS.

2A and 2B. As determined by experiments, jitter can largely vary in dependence of signal strength (due to IR transmitter power and/or distance), environmental conditions (external disturbances), signal direction (angle, level of reflections) etc. An example of error distribution in pulse burst durations TONE using pulse duration of TONE=1000 us and gap duration of TZERO=500 us captured by the 38 kHz sensor is shown in the histogram of 1000 IR pulse samples in FIG. 2F. In this example, we can approximate jitter as ΔT=30 microseconds (ca. T0).

Figure 3A:
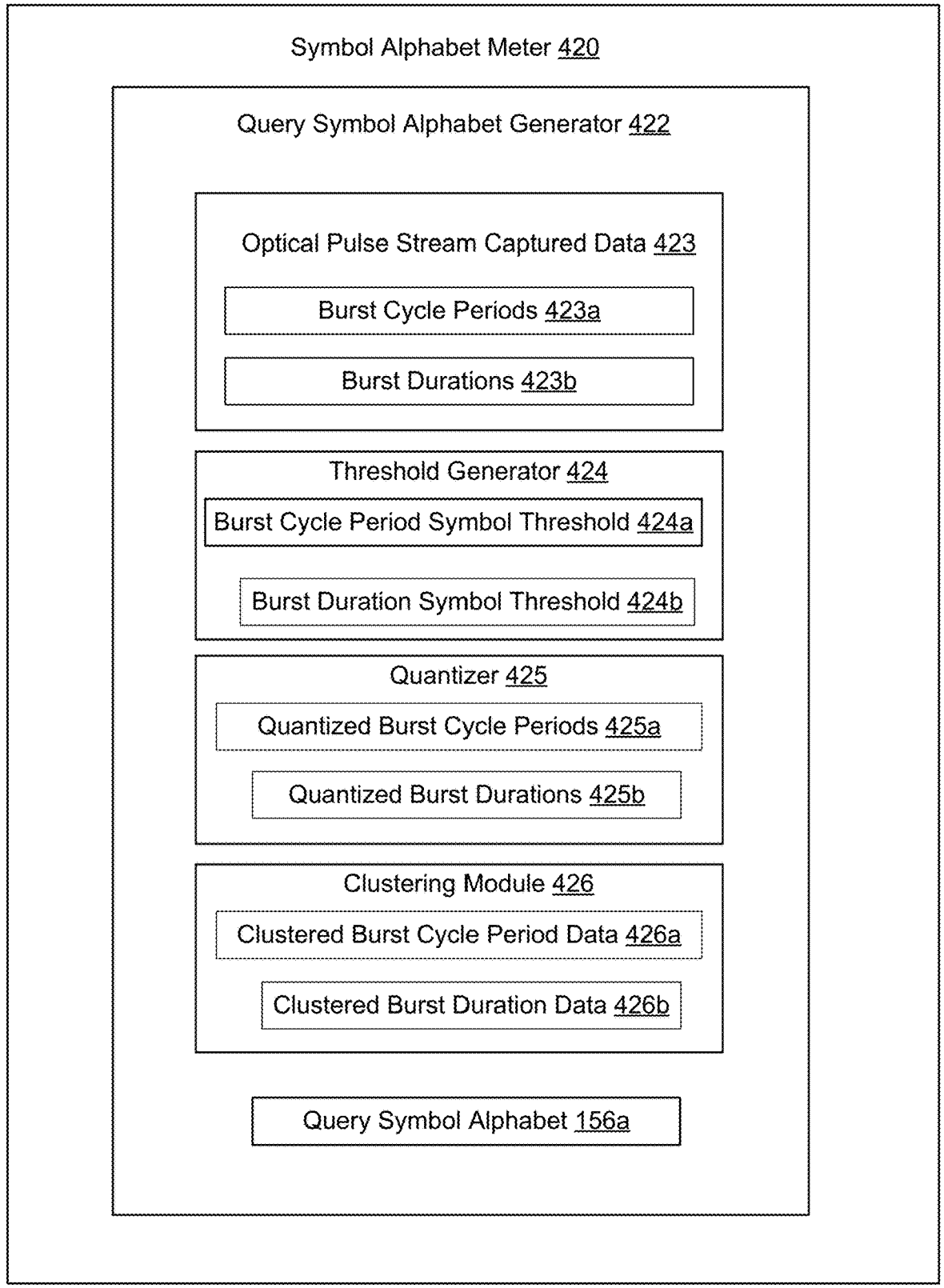
FIG. 3A is a detailed block diagram of the Symbol Alphabet Meter of the example media monitoring meter systems shown in FIGS. 1A and 1B.

FIG. 3A is a detailed block diagram of the symbol alphabet meter 420 of the example media monitoring meter system 100a, 100b shown in FIGS. 1A and 1B. As shown in the example of FIG. 3A, the symbol alphabet meter 420 can include a query symbol alphabet generator 422 to generate a query symbol alphabet 156a from the optical pulse stream capture data 423. The optical pulse stream captured data 423 includes the burst cycle periods 423a and burst durations 423b.

The example query symbol alphabet generator 422 of the example symbol alphabet meter 420 can include a threshold generator 424 to generate a burst cycle period symbol threshold 424a and a burst duration symbol threshold 424b. The example query symbol alphabet generator 422 of the symbol alphabet meter 420 can also include a quantizer 425 to quantize the respective burst cycle periods 423a and respective burst durations 423b into corresponding quantized burst cycle periods 425a and quantized burst durations 425b based on the burst cycle period symbol threshold 424a and the burst duration symbol threshold 424b. The example query symbol alphabet generator 422 of the example symbol alphabet meter 420 can also include a cluster module 426 to cluster the quantized burst cycle periods 425a and quantized burst durations 425b into clustered burst cycle period data 426a and clustered burst duration data 426b. Accordingly, the example query symbol alphabet generator 422 of the example symbol alphabet meter 420 is to generate the query symbol alphabet 156a based on the clustered burst cycle period data 426a and the clustered burst duration data 426b.

Symbols are the distinct pieces of information in a message. The infrared optical pulse stream coding schemes employed by the media remote control convert the message of key code information into combinations of discrete burst durations and burst cessations. This results in sensor outputs of TONE (e.g., burst duration) and TPERIOD (e.g. burst cycle period) for the Optical Sensor coupled to the Optical Capture Meter. The teachings of this disclosure define a symbol as a distinct pulse shape based on time intervals. While the following discussions primarily focuses on separate symbols in TONE (e.g., burst duration), they are likewise applied to TPERIOD (e.g. burst cycle period) for generation of the query symbol alphabet 156a by the query symbol alphabet generator 422 of the symbol alphabet meter 420. Accordingly, the query symbol alphabet of the optical pulse stream captured data is a sequence of symbols extracted from the optical pulse stream captured data by the query symbol alphabet generator 422 of the symbol alphabet meter 420 (e.g. the sequence of symbols extracted from the sequences of burst cycle periods 423a and burst durations 423b of the optical pulse stream captured data 423.)

Figure 3B:
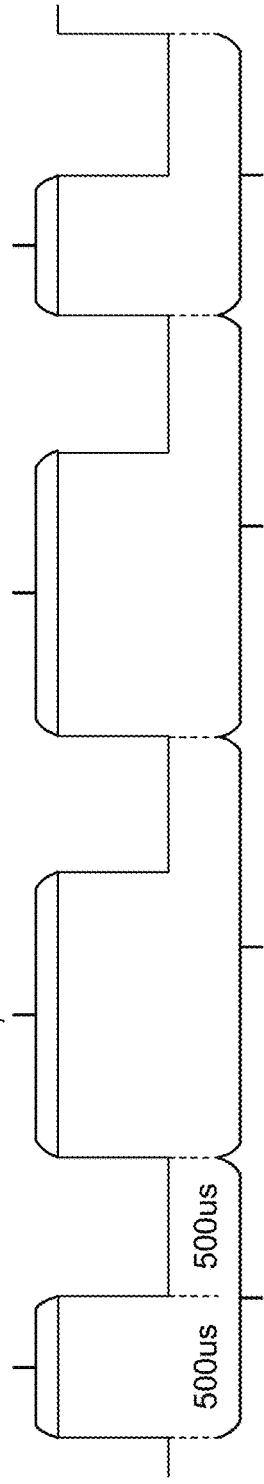
FIGS. 3B and 3C illustrate aspects of generation of the Query Symbol Alphabet by the Symbol Alphabet Meter of the example media monitoring meter systems shown in FIGS. 1A, 1B and 3A.
Figure 3C:
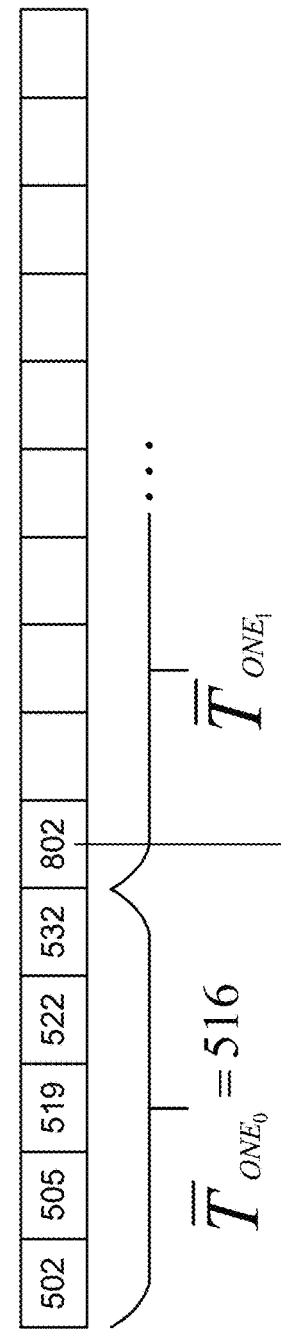

FIGS. 3B and 3C illustrate aspects of generation of the query symbol alphabet 156a by the query symbol alphabet generator 422 of the symbol alphabet meter 420 of FIGS. 1A, 1B and 3A. For example, the infrared optical pulse stream can be captured in the form of a continuous sequence of interchanging Burst Durations (TONE(n)) and gaps or burst cessations (TZERO(n)) with different durations at microsecond resolution in 16-bit form. This leads to the following definition of the incoming stream as the sequence TIR(n) with the length N:

$$TIR(N)=(TONE(0),TZERO(0),TONE(1),TZERO(1),\ldots,TONE(N/2-1))$$

Due to the fact that the IR stream finishes with the "infinitely" long gap, the last element TZERO(N/2−1) is omitted. Based on teachings of this disclosure as discussed previously herein, using TPERIOD (e.g. Burst Cycle Periods) introduces less error and is less jitter prone than using TZERO (e.g., burst cessation) as processing input parameters for the query symbol generator, e.g., the optical pulse stream captured data as processing input parameters for the query symbol generator. For example, the jitter in TZERO e.g., burst cessation can be consequently symmetrically inhibited by the jitter of TONE e.g. burst duration within the same period.

To make the processing by the query symbol alphabet generator 422 of the symbol alphabet meter 420 more transparent, the optical pulse stream can be decomposed into optical pulse stream captured data comprising sequences of TONE(n) e.g., burst duration and TPERIOD(n) e.g., burst cycle period. The optical pulse stream captured data comprising sequences of TONE(n) e.g., burst duration and TPERIOD(n) e.g., burst cycle period can be processed as separate sequences where appropriate as illustrated for example in FIG. 3B.

As illustrated in FIG. 3C, the quantizer 424 and clustering module 426 of the query symbol alphabet generator 422 of the alphabet symbol meter 420 differentiate the symbols (i.e. quantize the same symbols into the corresponding groups or clusters). FIG. 3C shows an example of query symbol alphabet 156a extraction from the optical pulse stream captured data 423 by the query symbol alphabet generator 422 of the alphabet symbol meter 420. The query symbol alphabet generator 422 of the alphabet symbol meter 420 is configured to assume that there exists thresholds TTH that defines the minimum distance between pulse timings representing different symbols. For example, the threshold generator 424 generates the burst cycle period symbol threshold 424a and the burst duration symbol threshold 424b. The threshold generator 424 is configured to define d(n) as the distance e.g., the difference between the burst durations T(n) (either TONE(n) or TPERIOD(n) when treated separately) and the average value of the pulse cluster indexed by k to the average of the closest cluster, and use this difference to identify different symbols: dsubONE(n) =TsubONE(n+1) minus the average of TsubONEk>TTH In the example of FIG. 3C: TsubONE(n+1) is for example 802; from the previous and closest cluster, the average of TsubONEk is for example 516; the arithmetic difference by subtraction is 286; since 286 is greater than the threshold TTH of 100, it is concluded that the new cluster TsubONE1 is to be started with the new average TsubONE1 as shown in FIG. 3C.

Moreover, if the distance d(n) is greater than the threshold TTH, the quantizer 425 is configured to conclude that T(n) and T(n+1) correspond to different symbols, else they represent the same symbol. Accordingly, the quantizer 425 can quantize the burst cycle periods 423a and burst durations 423b into quantized burst cycle periods 425a and quantized burst durations 425b corresponding to the foregoing symbol determination, and based on the burst cycle period symbol threshold 424a and the burst duration symbol threshold 424b.

The optical pulse stream captured data includes an unknown amount of jitter. The query symbol alphabet generator 422 of the optical capture meter 410 is configured to limit the effect of jitter in order to process the optical pulse stream captured data consistently. Jitter ($\pm\Delta T$) is defined herein as deviation with purely random distribution such that its average value with large enough set of equal burst durations (N) averages out to zero. Accordingly, it is the teaching of this disclosure that query symbol alphabet generator 422 of the optical capture meter 410 can reduce the effect of jitter by averaging multiple occurrences of the symbols within the message. Moreover, the higher number of symbol repetition, the higher degree of jitter rejection can be achieved by the query symbol alphabet generator 422 of the optical capture meter 410. Defining the set of different average values of burst durations from TONE(n), and assuming M is large enough to apply, the query symbol alphabet generator 422 of the optical capture meter 410 calculates an element as the average value of all captured timings (M burst durations out of N received). Obviously, for symbols, which do not repeat within the message (single occurrence), this jitter reduction technique of the optical capture meter 410 has no effect. These symbols are more likely to occur in non-data bits of infrared protocols (i.e. header, leading bits etc.).

The value of the quantization threshold TTH of the burst cycle period symbol threshold 424a and the burst duration symbol threshold generated by the threshold generator 424 is, in part, empirically determined by measurements of the optical sensor. The foregoing can depend on the optical sensor's response characteristics over a wide range of stimuli and disturbances.

The threshold TTH of the burst cycle period symbol threshold 424a and the burst duration symbol threshold generated by the threshold generator 424 can be based on experimentally determined optical sensor properties programmed into the threshold generator 424. For example, for the 38 kHz sensor the T0=26 us. From data collected by empirical measurements, the TTH threshold value must not be greater than 137 us, which may be the lowest bit width in infrared signaling protocols.

Based on experimental results, the average jitter can be estimated as $\Delta T=\pm 2 \cdot T0$. Taking the foregoing into account, the symbol alphabet meter 420 is configured to generate the threshold of $2 \cdot \Delta T=\pm 4 \cdot T0$ in the worst case. Based on this, threshold TTH of the burst cycle period symbol threshold 424a and the burst duration symbol threshold generated by the threshold generator 424 can be the minimum approximated threshold TTH=100 microseconds. This value can be employed for the threshold TTH of the burst cycle period symbol threshold 424a and the burst duration symbol threshold generated by the threshold generator 424 as the rule of thumb for quantization of TONE(n) and TPERIOD(n). If the quantizer 425 applies shorter threshold TTH value than this for the burst cycle period symbol threshold 424a and the burst duration symbol threshold, the uncertainty of the quantization process increases, meaning that infrared signaling protocols with pulse burst distances shorter than this value may not be processed reliably, due to the higher impact of jitter.

It is also worthy to note, that this threshold definition TTH of the burst cycle period symbol threshold 424a and the burst duration symbol threshold is based on optical sensor properties rather than jitter of the transmitters used by media remote controls to generate the optical pulse stream. In practice, experiments with real remotes and the analysis of an open source database show that the optical pulse streams from the remotes are relatively consistent and jitter in the optical pulse stream captured data may be accumulated mostly in the optical sensors' response (affected by signal direction, angle, power, reflections, disturbances etc.).

Based on the foregoing, for query symbol alphabet 426 extraction, the quantizer 425 and the clustering module 426 of the query symbol alphabet generator 422 of the symbol alphabet meter 420 operate to quantize and cluster optical pulse stream captured data 423 based on threshold distance from the average values of the nearby symbols e.g. pulse burst groups (clusters). The example sequence for query symbol alphabet 426 extraction implemented by the quantizer 425 and the clustering module 426 of the query symbol alphabet generator 422 can be described in the following simplified sequence for TONE(N) e.g., burst durations 423b (the same applies for TPERIOD(N) e.g. burst cycle periods 423a):

1. Sort elements from TONE(N) e.g. burst duration ascending,
2. Start with sample index n=0 and set cluster average to TONE(0),
3. Fetch the next sample TONE(+1),
4. Calculate dONE(n) and perform threshold comparison (e.g. the quantizer 425 quantizes burst duration 423b into corresponding quantized burst duration 425b based on the burst duration symbol threshold 424b; and the clustering module 426 clusters the quantized burst duration 425b into clustered burst duration data 426b based on threshold distance from the average values of the nearby symbols e.g., pulse burst groups).
5. If greater, start new cluster; if lower, recalculate and update current cluster average,
6. Continue to step 3 and repeat until n=N−1.

The foregoing sequence of detecting the first cluster of clustered burst duration data 426b is illustrated as a practical example in FIG. 3C for clarity.

As discussed, a similar simplified sequence is followed by the quantizer 425 and clustering module 426 for determining clustered burst cycle period data 426a based on burst cycle periods 423a of the optical pulse stream captured data 423:

1.* Sort elements from TPERIOD(N) e.g. burst cycle period ascending,
2. * Start with sample index n=0 and set cluster average to TPERIOD(0),
3.* Fetch the next sample TPERIOD(+1),
4.* Calculate dPERIOD(n) and perform threshold comparison (e.g. the quantizer 425 quantizes the burst cycle period 425a into the quantized burst durations 425b based on the burst duration symbol threshold 424b; and the clustering module 426 clusters the quantized burst durations 425b into clustered burst duration data 426b based on threshold distance from the average values of the nearby symbols e.g., period groups).
5.* If greater, start new cluster; if lower, recalculate and update current cluster average,
6. * Continue to step 3* and repeat until n=N−1.

As discussed, the query symbol generator 422 of the symbol alphabet meter 420 generates the sequence of symbols of the query symbol alphabet 156a based on the clustered burst cycle period data 426a and the clustered burst duration data 426b, as illustrated for example in FIG. 3C.

After the query symbol generator 422 of the symbol alphabet meter 420 generates the sequence of symbols of the query symbol alphabet 156a, additional message characteristics of the optical pulse stream captured data can be generated by the message size meter 440 and the symbol distribution meter 430. the message size meter 440 can generate a query message size 159a based on the captured data of the optical pulse stream 801. Similarly, the symbol distribution meter 430 can generate a query symbol distribution 158a based on the captured data of the optical pulse stream 801.

In the teachings of this disclosure, core properties, which can define the message structure, can be: query message size 159a e.g., the total number of transmitted symbols (N), query symbol alphabet 156a and query symbol distribution 158a.

The query symbol alphabet 156a can be included the query optical pulse signature 154a for use in identification of different symbols used in a message. As discussed, the symbol alphabet meter 420 identifies the query symbol alphabet 156a based on quantization. the query symbol alphabet S (e.g., separately for SONE e.g., query burst duration symbol alphabet and SPERIOD e.g., query burst cycle period symbol alphabet) is defined as the set of all unique values found in the captured sequence T(n) (i.e. TONE(n) and TPERIOD(n)). To form the query symbol alphabet as defined, these unique values are abstracted into the finite set of symbols that are the query symbol alphabet, which is characteristic for the captured sequence. Instead of processing the entire sequence, the teachings of this disclosure focus on processing the extracted set of symbols, e.g. the query symbol alphabet. For example, for symbols sorted ascending: $T(n) \in S | Si < Si+1$ The query symbol distribution 158a provides information about how the symbols are ordered in the message. For example, the distribution of symbols in a received sequence T(n) can be represented by the symbol sequence s(n), e.g. query symbol distribution 158a, which captures the original optical pulse stream captured data as the sequence of indexes of symbols of the query symbol alphabet 156a: $s(n)=i | T(n)=Si$ The aforementioned components can enable extraction of the essential information from the messages encoded in the optical pulse stream captured data. They also can enable message reconstruction.

An example of the symbol alphabet meter extracting the query symbol alphabet 156a (e.g., set S) and the symbol distribution meter composing the query symbol distribution 158a (e.g., sequence s(N)) from the optical pulse stream captured data (for TPERIOD(N), wherein the same principle applies for TONE(N)), is demonstrated in FIG. 3D.

Additionally, sometimes different key codes from the same remote control correspond to identical query symbol distributions, but different query symbol alphabets. In such cases, the query symbol distribution cannot provide for differentiation between key codes due to the lack of query symbol alphabet information. By way of illustration of the foregoing, FIG. 3E shows an example comparison of corresponding query symbol distributions and query symbol alphabets for different key codes. In the example of FIG. 3E the query symbol alphabet is composed of compressed timing values of symbols (scaled by 25 microseconds) of size 1 byte (symbol value is written in hexadecimal). If difference matching is applied between symbols of different keys and the value of threshold TTH=100 us for Hamming distance is used for calculation (for compressed alphabet TTH is scaled to 100 us/25 us=4), the identification of keys is straightforward. The symbols marked in bold have the differences>4, indicating the keys are different (Hamming distance=2 between any of these keys.)

Figure 4A:
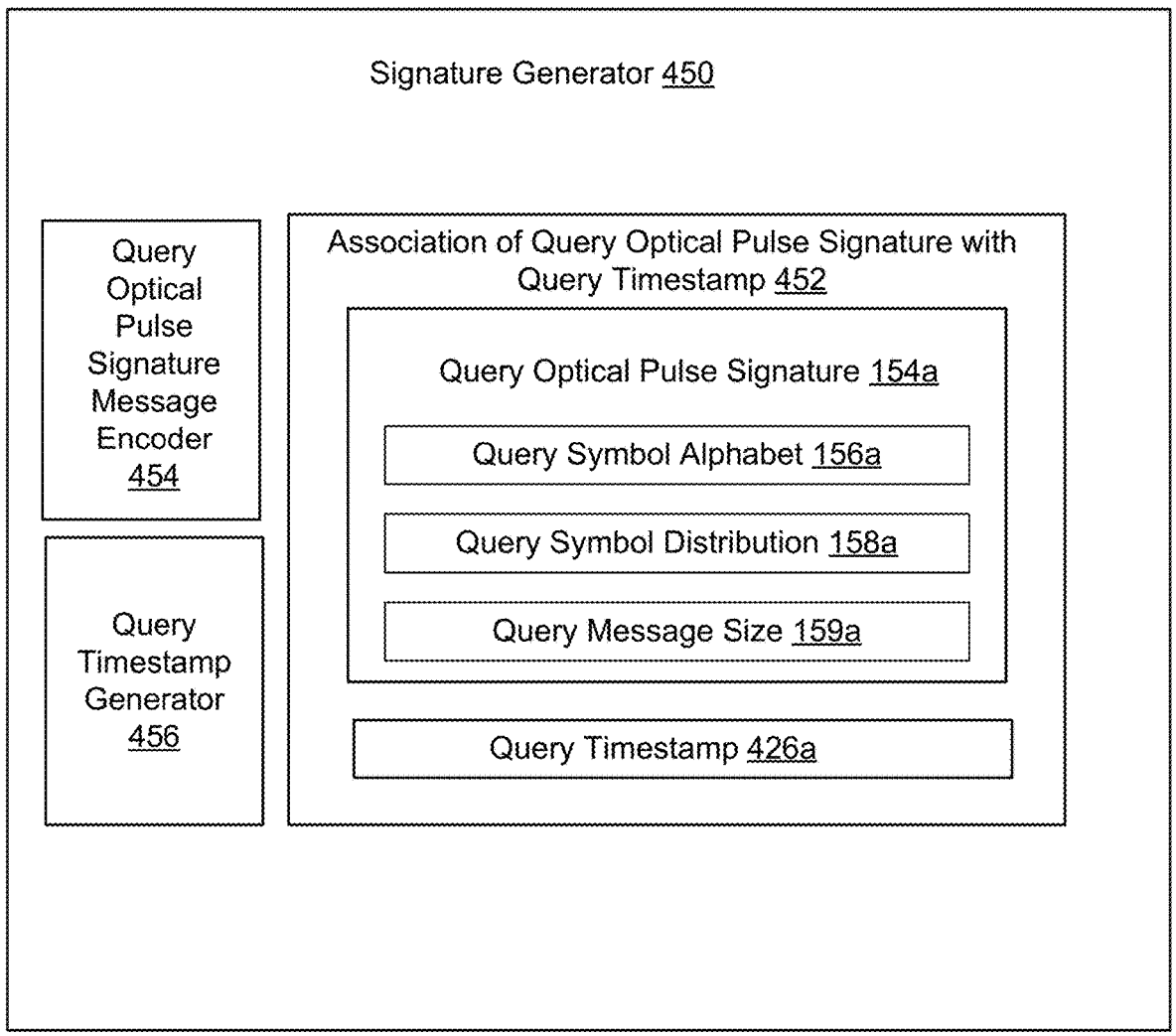
FIG. 4A is a detailed block diagram of example Signature Generator of the example media monitoring meter systems shown in FIGS. 1A and 1B.

FIG. 4A is a detailed block diagram of example Signature Generator 450 of the example media monitoring meter systems 100a, 100b shown in FIGS. 1A and 1B. The example signature generator 450 generates the query optical pulse signature 154a, which can include the query symbol alphabet 156a, the query symbol distribution 158a and the query message size 159a. The signature generator 450 can include query time stamp generator to generate the query timestamp 426a. The example signature generator 450 can associate the query optical pulse signature 154a with the query timestamp 426a, to provide the association of query optical pulse signature with query timestamp 452 shown in FIG. 4A. The signature generator can also include an optical pulse signature message encoder to encode the query optical pulse signature 154a into a message, as shown for example in FIG. 4B.

FIG. 4B is a message diagram illustrating an example message encoding of the example query optical pulse signature and the example query timestamp by the example signature generator shown in FIG. 4A. The example message encoding shown in FIG. 4B can begin with a heading and a first query timestamp associated with the query optical pulse signature. Next, the example message encoding can include a designation of signature type. Signature Type is type of signature and can be designated 0 for clustered, and can be designated 1 for sampled. Next, the example message encoding can include a designation of sampling rate of the optical capture meter for the optical pulse stream captured data. Sampling Rate can be a multiplier indicative of the sampling rate used (0=1×, =2×, 2=4×), coded in a 4 bits format. Next, the example message encoding can include a sensor index designation identifying a sensor, for example, when multiple sensors can be used in the optical sensor. For example, sensor index can identify the sensor from which the signature sequence was generated, coded in a 4 bits format. Next, the example message encoding can include a first signature millisecond value, which can be the first signature end time in milliseconds. Next, the example message encoding can include a first signature slot index designation. The first signature slot index can designate the number of signature bits that follows, before the start of a new signature. Next the example message encoding can include data bytes of a first signature. Next the example message encoding can include a second signature millisecond value, which can be the second signature end time in milliseconds. Next, the example message encoding can include a second signature slot index designation. The second signature slot index can designate the number of signature bits that follows, before the start of a next new signature. Next the example message encoding can include data bytes of a second signature.

FIG. 4C illustrates an example query optical pulse signature relative to example optical pulse stream captured data. The example optical pulse stream captured data is shown as comprising an example seventy bytes of data. The example query optical pulse signature is shown as comprising relatively substantially less at an example twenty bytes of data.

Figure 5A:
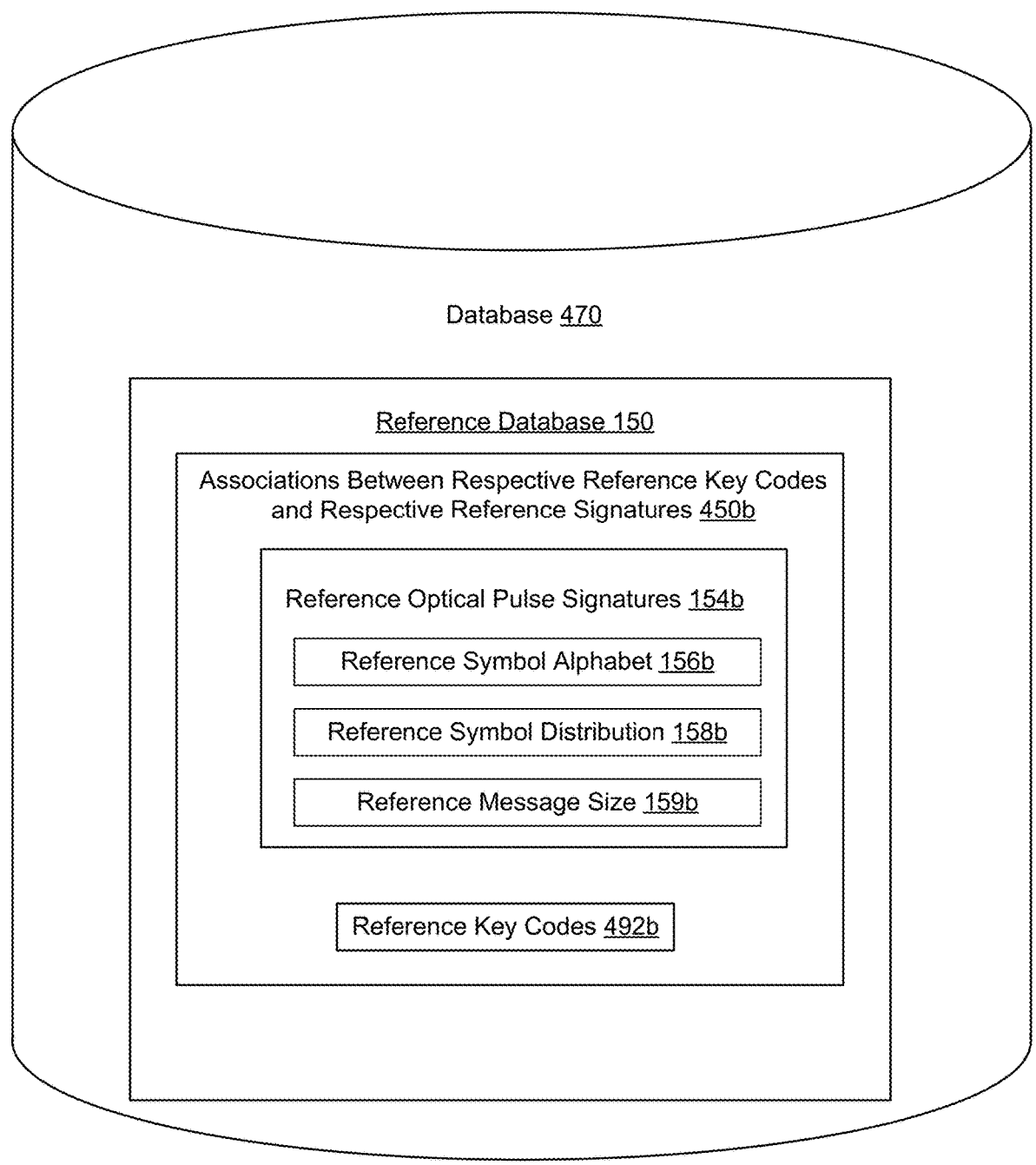
FIG. 5A is a detailed block diagram of example Database shown in the example of media monitoring meter systems of FIGS. 1A and 1B.

FIG. 5A is a detailed block diagram of example database 470 shown in the example of media monitoring meter systems 100a, 100b of FIGS. 1A and 1B. The database 470 can include reference database 150. The reference database 150 can include reference optical pulse signatures 154b. The reference optical pulse signatures 154b can include reference symbol alphabet 156b, reference symbol distribution 158b and reference message size 159b. The reference database 150 can also include reference key codes 492b, and can further include associations between respective key codes and respective reference signatures 450b. The database can retrieve reference optical pulse signatures 154b, for example, for matching by the signature matcher with query optical pulse signature. Also, as mentioned previously herein, the key code detector 490 can determine the key code corresponding to the key activated on the media remote control to control the media activity, based on the signature match and based on the associations between respective reference key codes and respective reference optical pulse signatures 450b in the reference database 150 of the database 470. In particular, the specific reference optical pulse signature 154b corresponding to the signature match can be used by the database 470 to search the reference database 150 to find the specific key code associated with the specific reference optical pulse signature 154b in the associations in the reference database 150.

Figure 5B:
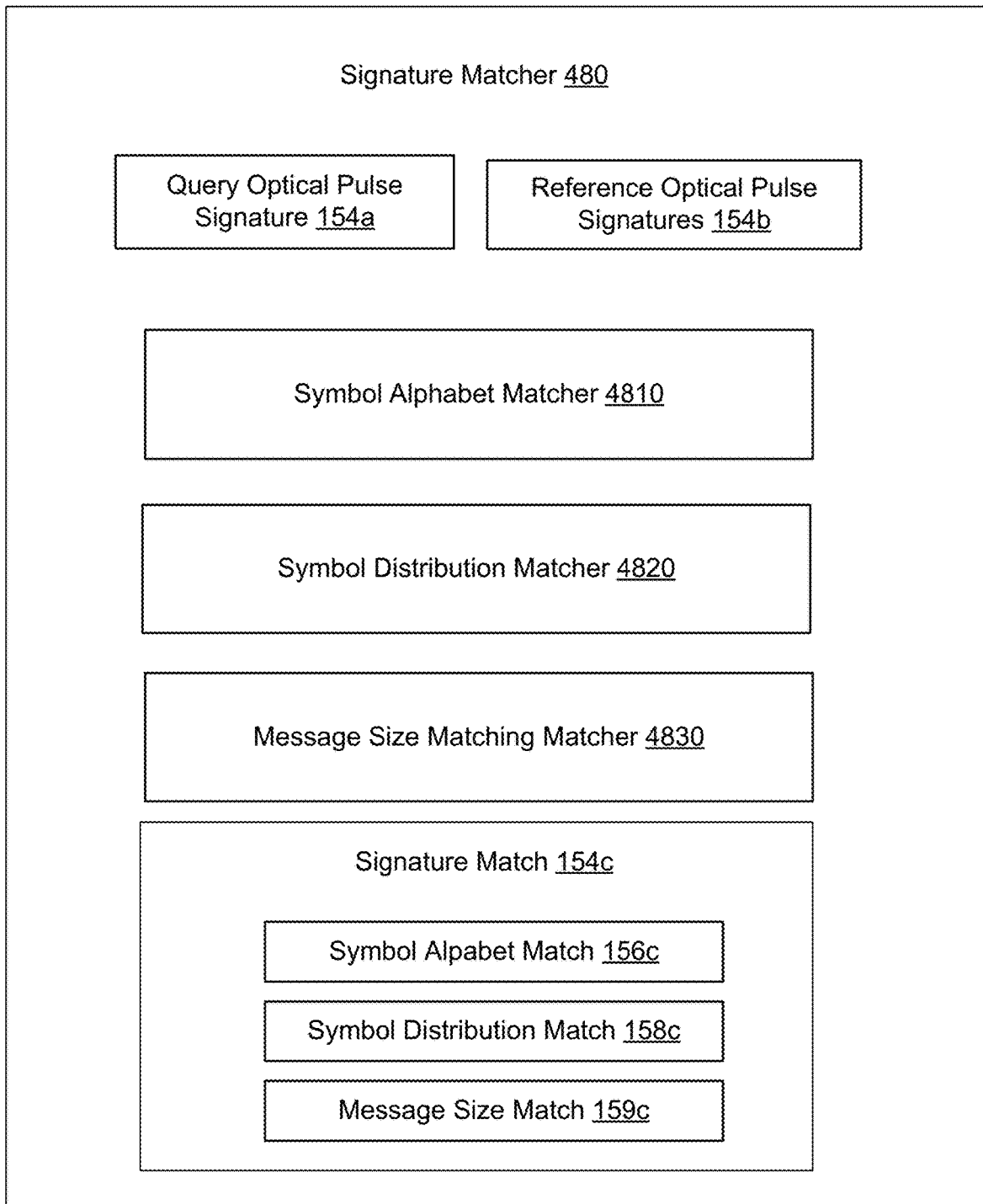
FIG. 5B is a detailed block diagram of example Signature Matcher shown in the example of media monitoring meter systems of FIGS. 1A and 1B.

FIG. 5B is a detailed block diagram of example signature matcher 480 shown in the example of media monitoring meter systems 100a, 100b of FIGS. 1A and 1B. The signature matcher 480 can use the database to retrieve reference optical pulse signatures 154b for matching operations with the query optical pulse signature 154a. The signature matcher 480 can generate the signature match 154c by matching the query optical pulse signature 154a with a reference optical pulse signature 154b, based on comparing the query optical pulse signature 154a with the reference optical pulse signature 154b.

The query optical pulse signature can include the query symbol alphabet, the query symbol distribution, and the query message size. The reference optical pulse signatures can include respective reference symbol alphabets, respective reference symbol distributions, and respective reference message sizes. The signature matcher 480 can include a symbol alphabet matcher 4810 to match the query symbol alphabet of the query optical pulse signature 154a with the reference symbol alphabet of the reference optical pulse signature 154b, based on comparing the query symbol alphabet with the reference symbol alphabet, to generate a symbol alphabet match 156c. The signature matcher 480 can include a symbol distribution matcher 4820 to match the query symbol distribution of the query optical pulse signature 154a with the reference symbol distribution of the reference optical pulse signature 154b, based on comparing the query symbol distribution with the reference symbol distribution, to generate a symbol distribution match 158c. The signature matcher 480 can include a message size matcher 4830 to match the query message size of the query optical pulse signature 154a with the reference message size of the reference optical pulse signature 154b, based on comparing the query message size to the reference message size, to generate a message size match 159c.

Figure 5C:
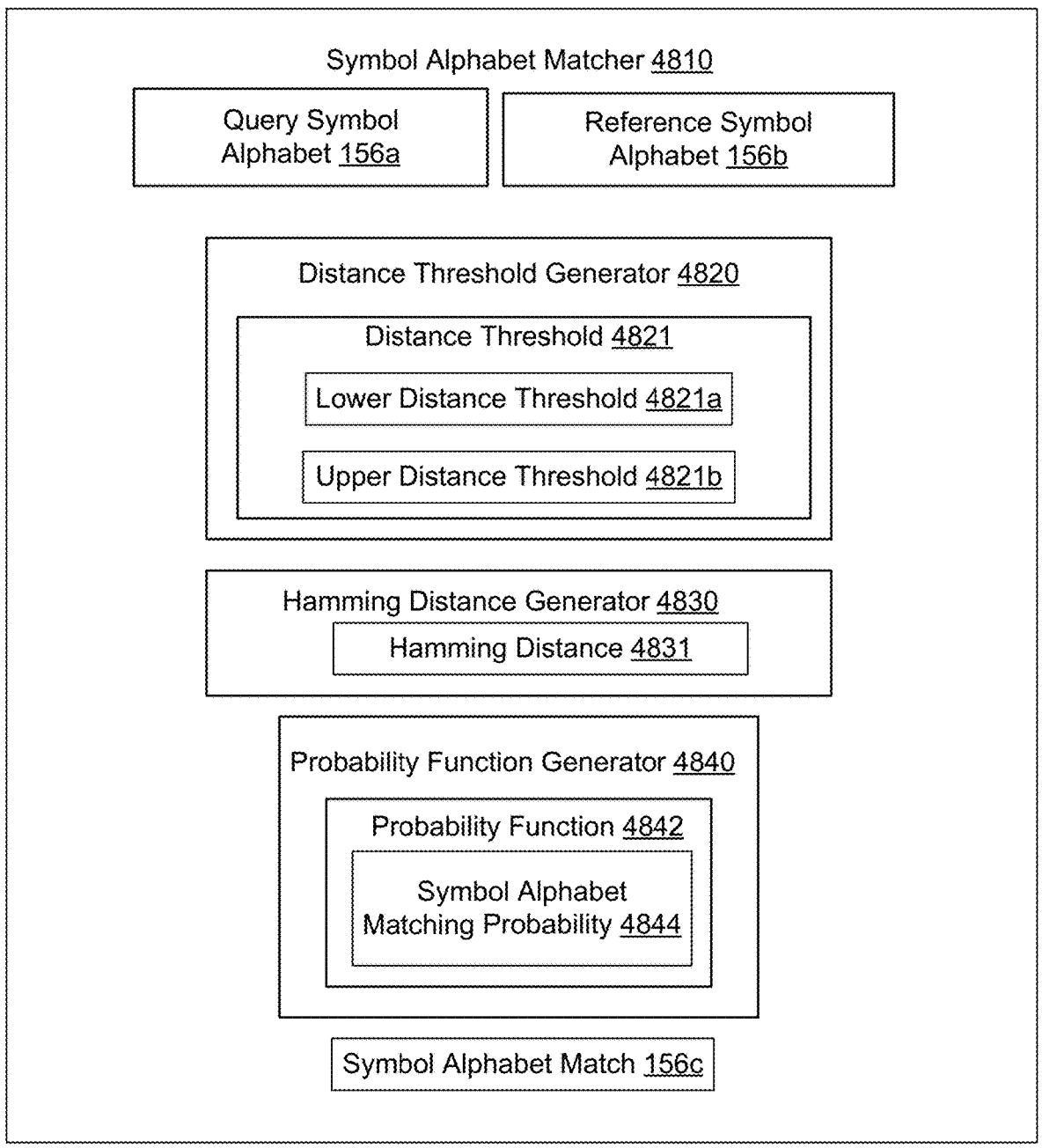
FIG. 5C is a detailed block diagram of example Symbol Alphabet Matcher shown in the example Signature Matcher of FIG. 5B.
Figure 6A:
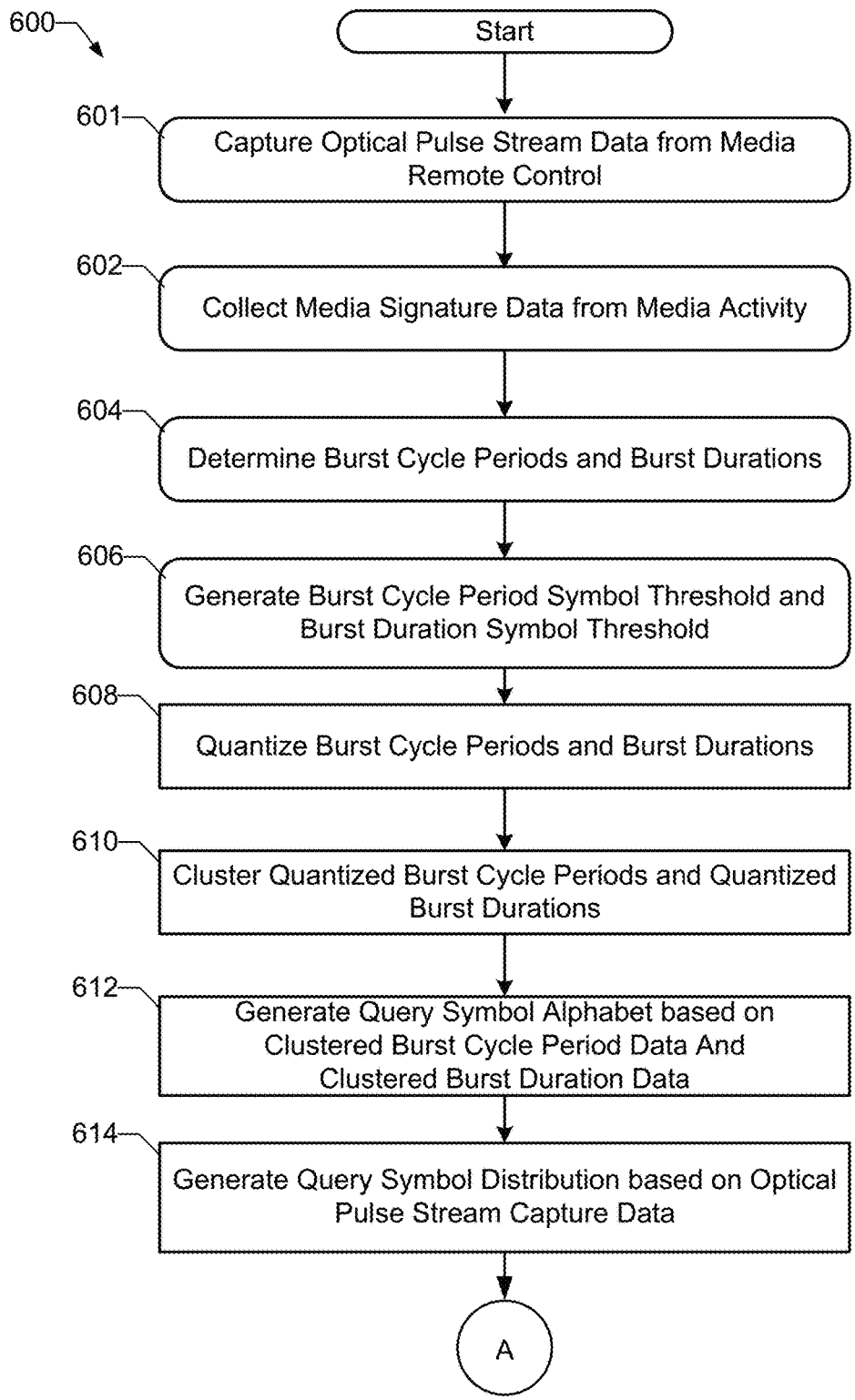
FIGS. 6A-6D is a flowchart representative of example machine readable instructions that may be executed to implement the example media monitoring meter system of FIG. 1A.
Figure 6B:
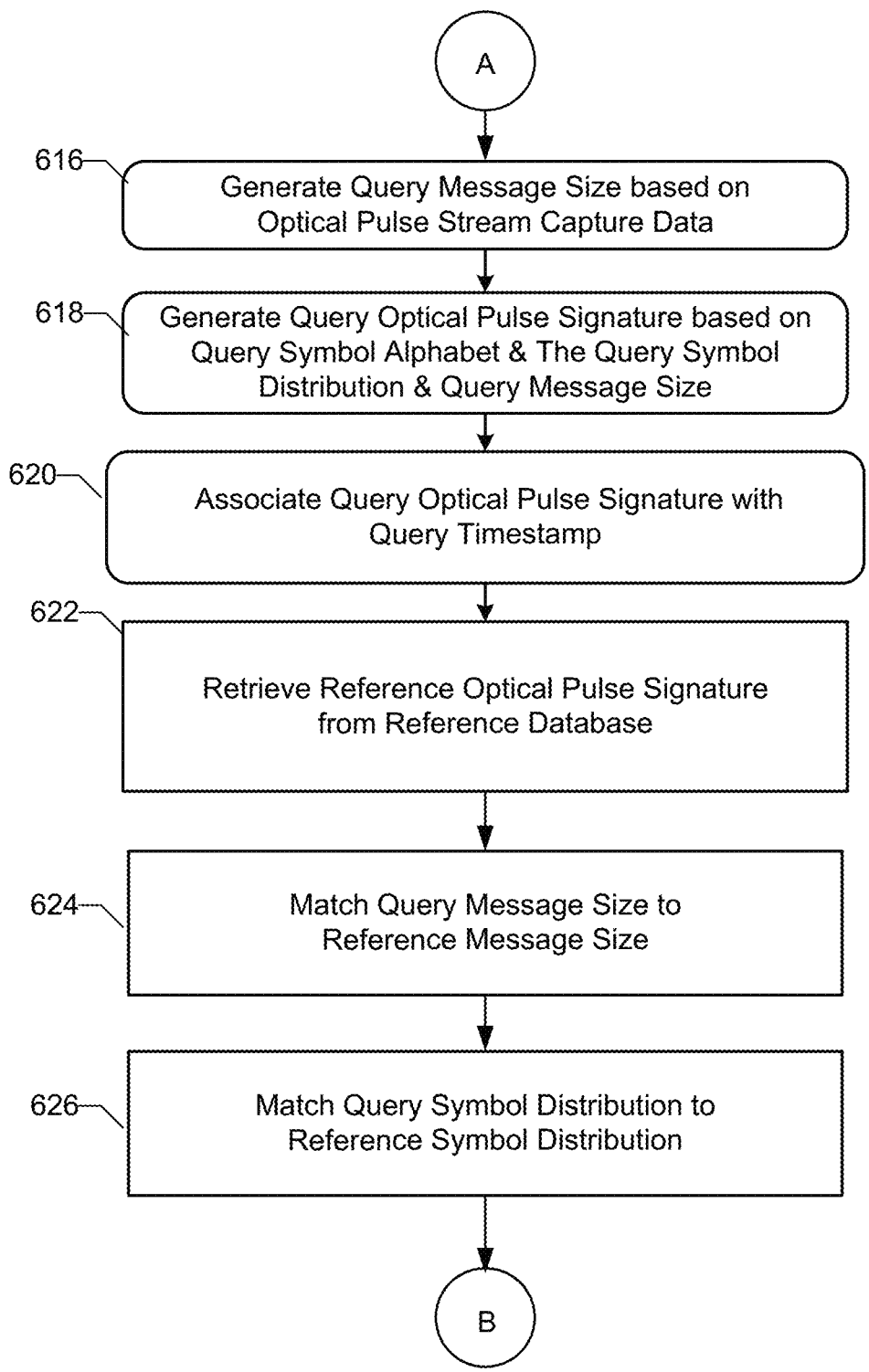
Figure 6C:
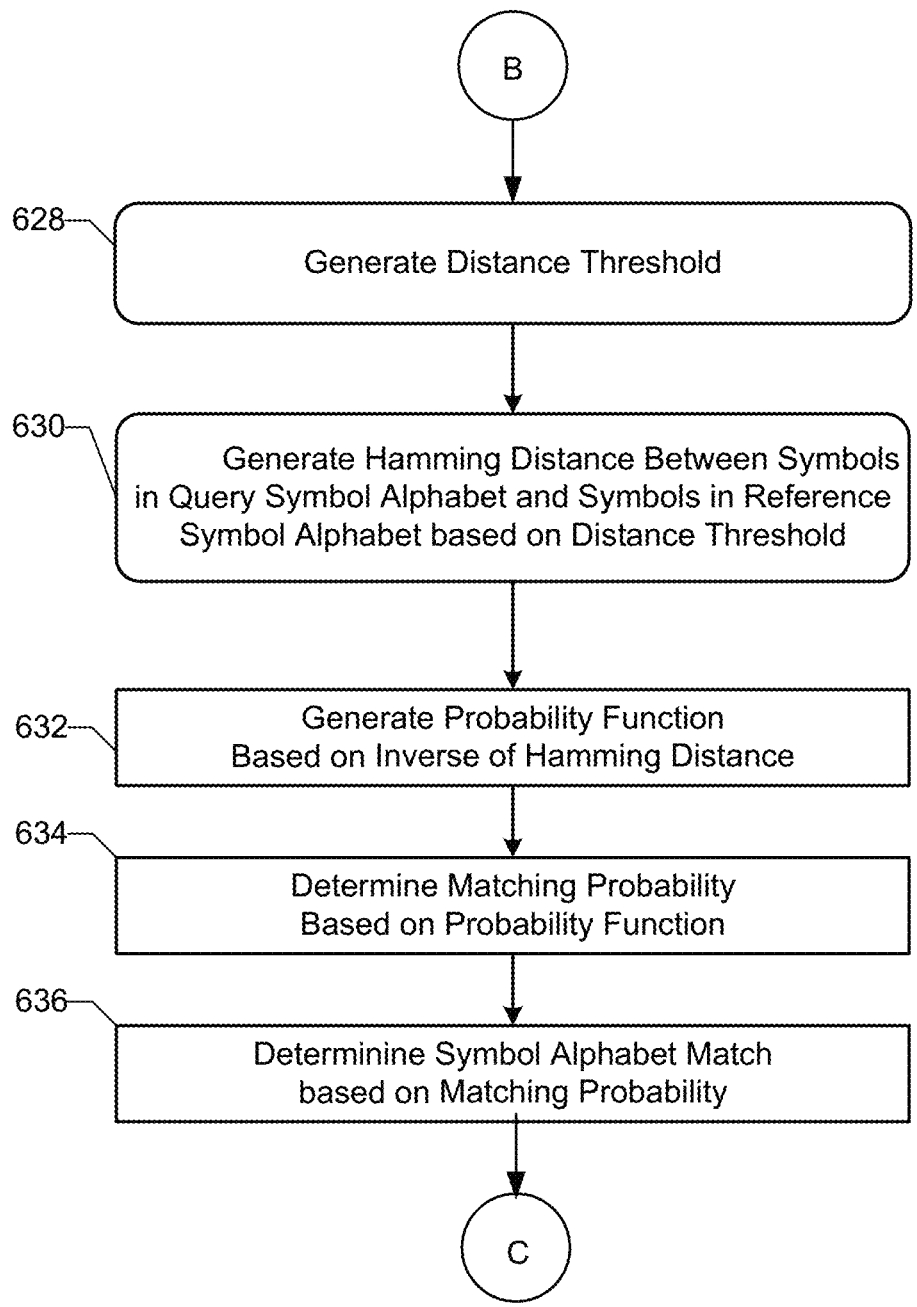
Figure 6D:
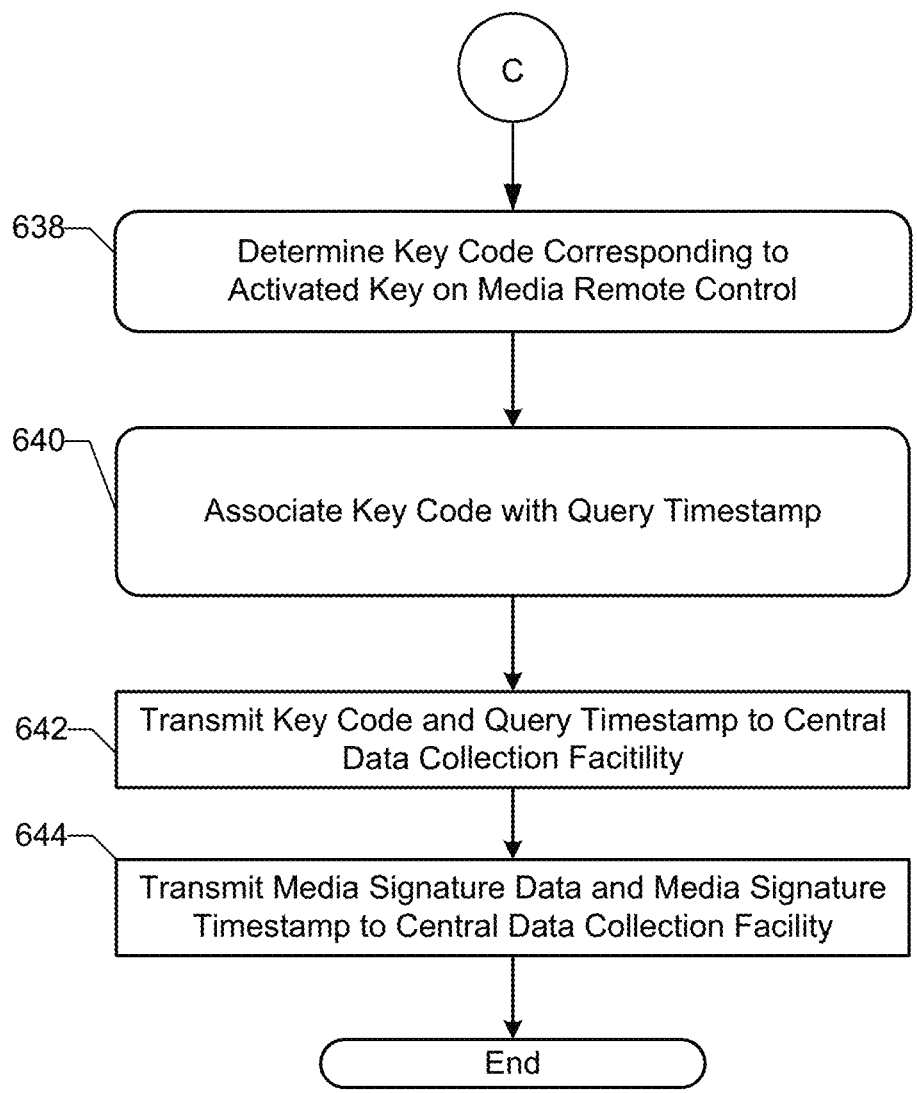

FIG. 5C is a detailed block diagram of example symbol alphabet matcher shown in the example matcher of FIG. 5B. The symbol alphabet matcher 4810 can match the query symbol alphabet 156a with the reference symbol alphabet 156b to generate the symbol alphabet match 156c. The symbol alphabet matcher 4810 can include a distance threshold generator 4820 to generate a distance threshold 4821. The distance threshold 4821 can include a lower distance threshold 4821a and an upper distance threshold 4821b. The symbol alphabet matcher 4810 can include a Hamming distance generator 4830 to generate a Hamming distance 4831 between symbols in the query symbol alphabet 156a and symbols in the reference symbol alphabet 156b based on the distance threshold 4821. The symbol alphabet matcher 4810 can include a probability function generator 4840 to generate a probability function 4842. In order to match the query symbol alphabet 156a, the symbol alphabet matcher 4810 can generate the probability function 4842 based on an inverse of the Hamming distance. Symbol alphabet matcher 4810 can determine a symbol alphabet matching probability 4844 based on the probability function 4842. The symbol alphabet matcher 4810 can determine the symbol alphabet match 156c based on the symbol alphabet matching probability 4844.

In appreciation of the foregoing description of operation of the symbol alphabet matcher 4810, it may be important to note the scattered nature of the optical pulse stream captured data that is the basis of the query symbol alphabet 156a, which in turn also has the scattered nature. It is the teaching of this disclosure to enhance the discrete Hamming distance calculation with a probability function to quantify a degree of matching between the query symbol alphabet 156a and the reference symbol alphabet 156b, to manage scattering in data values of the query symbol alphabet 156a and scattering in data values of the reference symbol alphabet 156b. This approach can be demonstrated on the suggested signature with compressed alphabet.

Further, the symbol alphabet matcher 4810 can perform simplified difference matching between individual symbols of the query symbol alphabet 156a and individual symbols of the reference symbol alphabet 156b. The difference matching can use absolute value of subtraction of individual symbols of the query symbol alphabet 156a and individual symbols of the reference symbol alphabet 156b, as a simple comparison for matching individual symbols of the query symbol alphabet 156a and individual symbols of the reference symbol alphabet 156b.

As discussed previously herein, taking jitter into account, the symbol alphabet meter 420 can be configured to generate the threshold of $2 \cdot \Delta T = \pm 4 \cdot T0$. Accordingly, using four as the threshold, when the resulting symbol difference is less than four (d<4), e.g. the distance threshold generator 4820 can generate a lower distance threshold 4821a of four, the symbol alphabet matcher 4810 can be configured to determine that the Hamming distance is zero, 0, and the individual symbols of the query symbol alphabet 156a and the reference symbol alphabet 156b being compared are substantially equal. This can be interpreted by the symbol alphabet matcher 4810 as a one-hundred percent, 100%, match of the individual symbols of the query symbol alphabet 156a and the reference symbol alphabet 156b being compared. For every symbol difference of greater than seven, d>7, e.g. the distance threshold generator 4820 can generate an upper distance threshold 4821b of seven, the Hamming distance increases by one, 1, (e.g. the Hamming distance 4831 generated by Hamming distance generator 4830 increases by one) and this can be interpreted by the symbol alphabet matcher 4810 as at least one symbol being different, which can be interpreted by the symbol alphabet matcher 4810 as a zero percent, 0%, match (e.g., no match). For symbol differences between four and seven, $4 \le d \le 7$, e.g. the symbol alphabet matcher 4810 can be configured to recognize this as an uncertainty region. based on the symbol alphabet matcher 4810 recognizing the uncertainty region, the probability function generator 4840 of the symbol alphabet matcher 4810 can generate a probability function 4842 (e.g., probability function, P.) Based on the symbol alphabet matcher 4810 recognizing the uncertainty region, the symbol alphabet matcher 4810 can apply probability function 4842 (e.g., probability function, P.) to the symbol difference, where applying probability function 4842 to higher symbol difference can generate lower matching probability, and where applying probability function 4842 to lower symbol difference can generate higher matching probability. For example, it can be expected that the matching probability can be one half, 0.5, or fifty percent, 50%, when all symbols have a difference of four, d=4.

The symbol alphabet matcher 4810 can be configured to weight the probability function 4842 according to the maximum symbol difference dmax found in difference matching between individual symbols of the query symbol alphabet 156$a$ and individual symbols of the reference symbol alphabet 156$b$, $d[n]$. If a symbol difference of maximum symbol difference dmax=5 is found, the probability is within one half and one quarter, 0.5<P≤0.25 etc. The related coefficients of maximum possible total matching probability KP can be expressed as KP=[1,0.5,0.25,0.12], where for maximum symbol difference dmax=4 the maximum total probability is 1 and for maximum symbol difference dmax=7 the maximum total probability is 0.12.

Contributions of individual symbols to the alphabet mismatch are defined by individual coefficients k, which can be expressed k=[0.5,0.25,0.12,0.06], where the symbol with maximum symbol difference dmax has maximum mismatch of 0.5 and the mismatch of symbols with lower symbol difference d are indexed successively from k by the symbol alphabet matcher 4810. A probability calculation model of the foregoing as can be implemented in the symbol alphabet matcher 4810 can be expressed as shown in FIG. 5D.

The symbol alphabet matcher 410 can recognize reference symbol alphabets 156$b$ of reference optical pulse signatures from the reference database with the highest matching probability (as determined by the symbol alphabet matcher 410) as relatively better qualified candidates for matching with the query symbol alphabet 156$a$. Candidates with maximum symbol difference dmax<4 can qualify for a straightforward match and consequently a corresponding matching probability threshold can be 50%. Candidates with lower probability can be designated as hints.

As mentioned previously herein, the symbol alphabet matcher 4810 can determine a symbol alphabet matching probability 4844 based on the probability function 4842. The symbol alphabet matcher 4810 can determine the symbol alphabet match 156$c$ based on the symbol alphabet matching probability 4844. In the example just discussed, the symbol alphabet matcher 410 of the signature matcher 480 can apply the foregoing probability function to the query symbol alphabet 156$a$ of the query optical pulse signature 154$a$ and the reference symbol alphabet 156$b$ of the reference optical pulse signature 154$b$. In other examples, the Signature Matcher 480 can apply a similar probability function to the entire (or portions of) query optical pulse signature 154$a$ (including the query symbol alphabet 156$a$ and/or the query symbol distribution and/or the query message size 159$a$) and of the entire (or portions of) reference optical pulse signature 154$b$ (including the reference symbol alphabet 156$b$ and/or the reference symbol distribution 158$b$ and/or reference message size 159$b$.) Accordingly, in other examples, the signature matcher 480 can determine a signature matching probability based on the similar probability function. The signature matcher 480 can determine the signature match 154$c$ based on the signature matching probability. However, it is the teaching of this disclosure that use of the symbol matching probability can provide for relatively more accurate key code determination with relatively lower processing load in generating the symbol matching probability, as compared with accuracy in key code determination from use of the entire signature matching probability, and processing load in generating the entire signature matching probability.

FIGS. 5E and 5F illustrate aspects of operation in the context of symbol alphabet matching by example symbol alphabet matcher of FIG. 5C and in the context of key code detection by example key code detector of FIG. 2B. As mentioned previously herein with reference to FIG. 2B, the key code detector 490 of the media monitoring meter 300$a$ can determine the key code 492, based on the query optical pulse signature 154$a$ including the query symbol alphabet 156$a$. The symbol alphabet matcher 4810 of the signature matcher 480 can determine the symbol alphabet match 156$c$ based on the symbol alphabet matching probability 4844, e.g., can determine the symbol alphabet match 156$c$ based on the highest symbol alphabet matching probability from among various relatively lower symbol alphabet matching probabilities. More generally, the signature matcher 480 can determine the signature match 154$c$ based on the signature matching probability, e.g., can determine the symbol alphabet match 156$c$ based on the highest symbol matching probability from among various relatively lower signature matching probabilities. In another example, the signature matcher 480 can determine the signature match 154$c$ based on the symbol alphabet matching probability 4844, e.g., can determine the signature match 154$c$ based on the highest symbol alphabet matching probability from among various relatively lower symbol alphabet matching probabilities. Accordingly, the key code detector 490 can determine the key code 492 corresponding to the key 494 activated on the media remote control 16 to control the media activity, based on the Signature match 154$c$ with the query optical pulse signature 154$a$ (and/or based on the symbol alphabet match 156$c$ with the query symbol alphabet 156$a$) and based on the associations between respective reference key codes and respective reference optical pulse signatures in the reference database of the database. The specific reference optical pulse signature corresponding to the signature match 154$c$ can be used by the database to search the reference database to find the specific key code associated with the specific reference optical pulse signature in the associations in the reference database.

The foregoing is illustrated in an example of FIG. 5D wherein the key code detector can determine the "numeral 5 key code" corresponding to the "numeral 5 key" activated on the media remote control to control the media activity, based on the symbol alphabet match with the query symbol alphabet having the one hundred percent 100% symbol alphabet matching probability. This is summarized in a row entry in FIG. 5D showing the numeral 5 key and the corresponding symbol alphabet symbol difference between symbols of the query symbol alphabet and the particular reference symbol alphabet associated with the numeral 5 key code, and the corresponding 100% symbol alphabet matching probability. For the sake of comparison, FIG. 5D also shows another row entry in FIG. 5D showing the numeral 6 key and the corresponding symbol alphabet symbol difference between symbols of the query symbol alphabet and the particular reference symbol alphabet associated with the numeral 6 key code, and the corresponding 22% symbol alphabet matching probability. For the sake of further comparison, FIG. 5D also shows yet another row entry in FIG. 5D showing the numeral 7 key and the corresponding symbol alphabet symbol difference between symbols of the query symbol alphabet and the particular reference symbol alphabet associated with the numeral 7 key code, and the corresponding 0% symbol alphabet matching probability.

Further illustration is provided in a more generalized signature example of FIG. 5E wherein the key code detector can determine the "numeral 5 key code" corresponding to the "numeral 5 key" activated on the media remote control to control the media activity, based on the more generalized signature match with the query optical pulse signature having the ninety-nine percent 99% signature matching probability. This is summarized in a row entry in FIG. 5E showing the numeral 5 key and the corresponding signature symbol difference between symbols of the query optical pulse signature and the particular reference optical pulse signature associated with the numeral 5 key code, and the corresponding 99% signature matching probability. For the sake of comparison, FIG. 5E also shows another row entry in FIG. 5E showing the numeral 6 key and the corresponding signature symbol difference between symbols of the query optical pulse signature and the particular reference optical pulse signature associated with the numeral 6 key code, and the corresponding 24% signature matching probability. For the sake of further comparison, FIG. 5E also shows yet another row entry in FIG. 5E showing the numeral 4 key and the corresponding signature symbol difference between symbols of the query optical pulse and the particular reference optical pulse signature associated with the numeral 4 key code, and the corresponding 12% signature matching probability.

While example manners of implementing the media monitoring meter systems 100a, 100b and media monitoring meters 300a, 300b of FIGS. 1A and 1B are illustrated in FIGS. 1C, 2A-2F, 3A-3E, 4A-4C, and 5A-5F, one or more of the elements, processes and/or devices illustrated in FIGS. 1C, 2A-2F, 3A-3E, 4A-4C, and 5A-5F may be combined, divided, re-arranged, omitted, eliminated and/or implemented in any other way. Further, the example media monitoring meter systems 100a, 100b, example central data collection facility 118, example central server 122, example central database 124, example media monitoring meters 300a, 300b, example optical sensor 302, example additional sensor 304, example timer/counter 306, example meter system 324a, example optical capture meter 410, example symbol alphabet meter 420, example symbol distribution meter 430, example message size meter 440, example signature generator 450, example collection meter 460, example database 470, example signature matcher 480, example key code detector 490, example network 726, example television 14, example media remote control 16, example optical pulse stream 801, example key 494, example signature match 154c, example query symbol alphabet generator 422, example optical pulse stream captured data 423, example burst cycle periods 423a, example burst durations 423b, example threshold generator 424, example burst cycle period symbol threshold 424a, example burst duration symbol threshold 424b, example quantizer 425, example quantized burst cycle periods 425a, example quantized burst durations 425b, example clustering module 426, example clustered burst cycle period data 426a, example clustered burst duration data 426b, example query optical pulse signature 154, example query symbol alphabet 156a, example query symbol distribution 158a, example query message size 159a, example query timestamp 426a, example association of query optical pulse signature with query timestamp 452, example query optical pulse signature message encoder 454, example query timestamp generator 456, example reference database 150, example reference optical pulse signatures 154b, example reference symbol alphabet 156b, example reference symbol distribution 158b, example reference message size 159b, example associations between respective reference key codes and respective reference signatures 450b, example reference key codes 492b, example symbol alphabet matcher 4810, example symbol distribution matcher 4820, example message size matcher 4830, example signature match 154c, example symbol alphabet match 156c, example symbol distribution match 158c, example message size match 159c, example distance threshold generator 4820, example distance threshold 4821, example lower distance threshold 4821a, example Hamming distance generator 4830, example Hamming distance 4831, example probability function generator 4840, example probability function 4842 and example symbol alphabet matching probability 4850 may be implemented by hardware, software, firmware and/or any combination of hardware, software and/or firmware. Thus, for example, any of the example media monitoring meter systems 100a, 100b, example central data collection facility 118, example central server 122, example central database 124, example media monitoring meters 300a, 300b, example optical sensor 302, example additional sensor 304, example timer/counter 306, example meter system 324a, example optical capture meter 410, example symbol alphabet meter 420, example symbol distribution meter 430, example message size meter 440, example signature generator 450, example collection meter 460, example database 470, example signature matcher 480, example key code detector 490, example network 726, example television 14, example media remote control 16, example optical pulse stream 801, example key 494, example signature match 154c, example query symbol alphabet generator 422, example optical pulse stream captured data 423, example burst cycle periods 423a, example burst durations 423b, example threshold generator 424, example burst cycle period symbol threshold 424a, example burst duration symbol threshold 424b, example quantizer 425, example quantized burst cycle periods 425a, example quantized burst durations 425b, example clustering module 426, example clustered burst cycle period data 426a, example clustered burst duration data 426b, example query optical pulse signature 154, example query symbol alphabet 156a, example query symbol distribution 158a, example query message size 159a, example query timestamp 426a, example association of query optical pulse signature with query timestamp 452, example query optical pulse signature message encoder 454, example query timestamp generator 456, example reference database 150, example reference optical pulse signatures 154b, example reference symbol alphabet 156b, example reference symbol distribution 158b, example reference message size 159b, example associations between respective reference key codes and respective reference signatures 450b, example reference key codes 492b, example symbol alphabet matcher 4810, example symbol distribution matcher 4820, example message size matcher 4830, example signature match 154c, example symbol alphabet match 156c, example symbol distribution match 158c, example message size match 159c, example distance threshold generator 4820, example distance threshold 4821, example lower distance threshold 4821a, example Hamming distance generator 4830, example Hamming distance 4831, example probability function generator 4840, example probability function 4842 and example symbol alphabet matching probability 4850 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media monitoring meter systems 100a, 100b, example central data collection facility 118, example central server 122, example central database 124, example media monitoring meters 300a, 300b, example optical sensor 302, example additional sensor 304, example timer/counter 306, example meter system 324a, example optical capture meter 410, example symbol alphabet meter 420, example symbol distribution meter 430, example message size meter 440, example signature generator 450, example collection meter 460, example database 470, example signature matcher 480, example key code detector 490, example network 726, example television 14, example media remote control 16, example optical pulse stream 801, example key 494, example signature match 154*c*, example query symbol alphabet generator 422, example optical pulse stream captured data 423, example burst cycle periods 423*a*, example burst durations 423*b*, example threshold generator 424, example burst cycle period symbol threshold 424*a*, example burst duration symbol threshold 424*b*, example quantizer 425, example quantized burst cycle periods 425*a*, example quantized burst durations 425*b*, example clustering module 426, example clustered burst cycle period data 426*a*, example clustered burst duration data 426*b*, example query optical pulse signature 154, example query symbol alphabet 156*a*, example query symbol distribution 158*a*, example query message size 159*a*, example query timestamp 426*a*, example association of query optical pulse signature with query timestamp 452, example query optical pulse signature message encoder 454, example query timestamp generator 456, example reference database 150, example reference optical pulse signatures 154*b*, example reference symbol alphabet 156*b*, example reference symbol distribution 158*b*, example reference message size 159*b*, example associations between respective reference key codes and respective reference signatures 450*b*, example reference key codes 492*b*, example symbol alphabet matcher 4810, example symbol distribution matcher 4820, example message size matcher 4830, example signature match 154*c*, example symbol alphabet match 156*c*, example symbol distribution match 158*c*, example message size match 159*c*, example distance threshold generator 4820, example distance threshold 4821, example lower distance threshold 4821*a*, example Hamming distance generator 4830, example Hamming distance 4831, example probability function generator 4840, example probability function 4842 and example symbol alphabet matching probability 4850 is/are hereby expressly defined to include a tangible computer readable storage device or storage disk such as a memory, a digital versatile disk (DVD), a compact disk (CD), a Blu-ray disk, etc. storing the software and/or firmware. Further still, example media monitoring meter systems 100*a*, 100*b*, example central data collection facility 118, example central server 122, example central database 124, example media monitoring meters 300*a*, 300*b*, example optical sensor 302, example additional sensor 304, example timer/counter 306, example meter system 324*a*, example optical capture meter 410, example symbol alphabet meter 420, example symbol distribution meter 430, example message size meter 440, example signature generator 450, example collection meter 460, example database 470, example signature matcher 480, example key code detector 490, example network 726, example television 14, example media remote control 16, example optical pulse stream 801, example key 494, example signature match 154*c*, example query symbol alphabet generator 422, example optical pulse stream captured data 423, example burst cycle periods 423*a*, example burst durations 423*b*, example threshold generator 424, example burst cycle period symbol threshold 424*a*, example burst duration symbol threshold 424*b*, example quantizer 425, example quantized burst cycle periods 425*a*, example quantized burst durations 425*b*, example clustering module 426, example clustered burst cycle period data 426*a*, example clustered burst duration data 426*b*, example query optical pulse signature 154, example query symbol alphabet 156*a*, example query symbol distribution 158*a*, example query message size 159*a*, example query timestamp 426*a*, example association of query optical pulse signature with query timestamp 452, example query optical pulse signature message encoder 454, example query timestamp generator 456, example reference database 150, example reference optical pulse signatures 154*b*, example reference symbol alphabet 156*b*, example reference symbol distribution 158*b*, example reference message size 159*b*, example associations between respective reference key codes and respective reference signatures 450*b*, example reference key codes 492*b*, example symbol alphabet matcher 4810, example symbol distribution matcher 4820, example message size matcher 4830, example signature match 154*c*, example symbol alphabet match 156*c*, example symbol distribution match 158*c*, example message size match 159*c*, example distance threshold generator 4820, example distance threshold 4821, example lower distance threshold 4821*a*, example Hamming distance generator 4830, example Hamming distance 4831, example probability function generator 4840, example probability function 4842 and example symbol alphabet matching probability 4850 may include more than one of any or all of the illustrated elements, processes and devices.

A flowchart representative of example machine readable instructions for implementing the media monitoring meter system 100*a* is shown in FIGS. 6A-6D. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 6A-6D, many other methods of implementing the example media monitoring meter system 100*a* may alternatively be used. For example, the order of execution of the blocks may be changed, and/or some of the blocks described may be changed, eliminated, or combined.

The method 600 of FIGS. 6A-6D begins at block 601. At block 601 the optical capture meter can capture data of the optical pulse stream from the media remote control. The captured data of the optical pulse stream can be associated with the query timestamp. At block 602, the collection meter can collect media signature data from the media activity controlled by the key activated on the media remote control. The media signature data can be associated with the media signature timestamp.

At block 606 the threshold generator of the query symbol alphabet generator can generate the burst cycle period symbol threshold and the burst duration symbol threshold. At block 608 the quantizer of the query symbol alphabet generator can quantize the burst cycle periods and the burst durations into corresponding quantized burst cycle periods and quantized burst durations based on the burst cycle period symbol threshold and the burst duration symbol threshold. At block 610, the clustering module of the query symbol alphabet generator can cluster the quantized burst cycle periods and quantized burst durations into clustered burst cycle period data and clustered burst duration data. At block 612 the query symbol alphabet generator can generate the query symbol alphabet based on the clustered burst cycle period data and the clustered burst duration data.

At block 614, the symbol distribution meter can generate the query symbol distribution based on the captured data of the optical pulse stream. At block 616, the message size meter can generate the query message size based on the captured data of the optical pulse stream. At block 618 the signature generator can generate the query optical pulse signature based on the query symbol alphabet, the query symbol distribution, and the query message size. At block 620, the query optical pulse signature can be associated with the query timestamp.

At block 622, the database can retrieve a reference optical pulse signature from a reference database. At block 624, the message size matcher of the signature matcher can match the query message size of the query optical pulse signature to the reference message size of the reference optical pulse signature. At block 626, the symbol distribution matcher of the signature matcher can match the query symbol distribution of the query optical pulse signature to a reference symbol distribution of the reference optical pulse signature.

At block 628, the distance threshold generator of the symbol alphabet matcher can generate a distance threshold. At block 630, the Hamming distance generator of the symbol alphabet matcher can generate a Hamming distance between symbols in the query symbol alphabet and symbols in the reference symbol alphabet based on the distance threshold. At block 632, the probability function generator can generate the probability function based on the inverse of the Hamming distance. At block 634, the determining a matching probability based on the probability function. At block 636, the symbol alphabet matcher can determine the symbol alphabet match based on the matching probability.

At block 638, the key code detector can determine the key code corresponding to the key activated on the media remote control to generate the optical pulse stream. As discussed, the key code is determined based on the query optical pulse signature match with the reference optical pulse signature (e.g., the message size match between the query message size and the reference message size, the symbol distribution match between the query symbol distribution and the reference symbol distribution, and the symbol alphabet match between the query symbol alphabet and the reference symbol alphabet.) At block 640, the key code can be associated with the query timestamp. At block 642, the key code and the query timestamp can be transmitted to the central data collection facility. At block 644, the media signature data and the media signature timestamp can be transmitted to the central data collection facility. After block 644, the method 600 can end.

As mentioned above, the example processes of FIGS. 6A-6D may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6A-6D may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
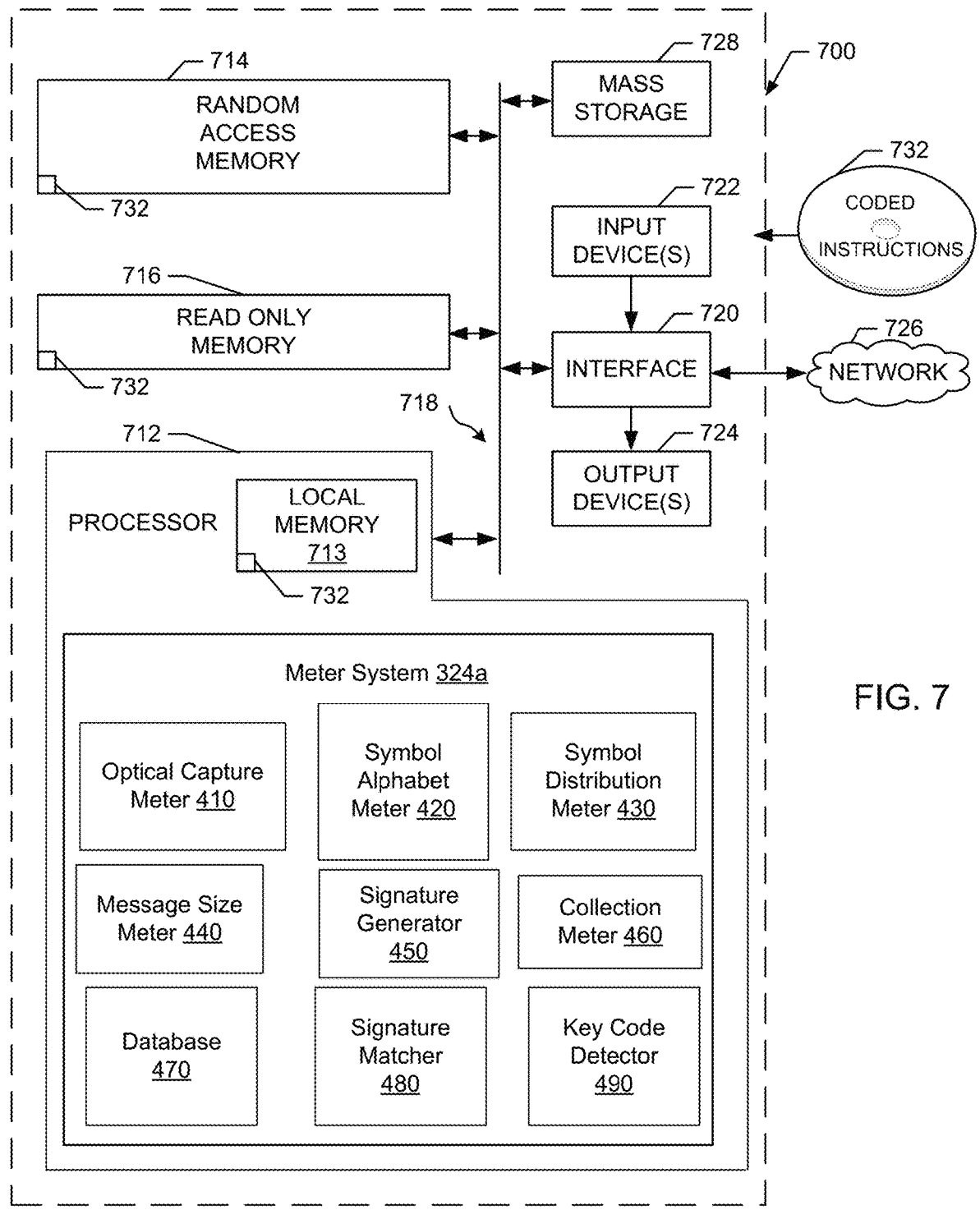
FIG. 7 is a block diagram of an example processing platform capable of executing the machine readable instructions of FIGS. 6A-6D to implement the example media monitoring meter system of FIG. 1A.

FIG. 7 is a block diagram of an example processing platform capable of executing the machine readable instructions of FIGS. 6A-6D to implement the example media monitoring meter system of FIG. 1A. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. The hardware of processor 712 can be virtualized using virtualization such as Virtual Machines (VM's) and/or containers. The processor 712 can implement example meter system 324a. Example meter system 324a includes example optical capture meter 410, example symbol alphabet meter 420, example symbol distribution meter 430, example message size meter 440, example signature generator 450, example collection meter 460, example database 470, example signature matcher 480 and example key code detector 490.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 6A-6D may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture provide for media monitoring and audience measurement. For example, the optical capture meter can capture data of the optical pulse stream detected from the media remote control. The key code detector can determine the key code, based on the query optical pulse signature including a query symbol alphabet. The key code corresponds to the key activated on the media remote control to control the media activity (e.g., changing television channels.) The foregoing can provide a generalized way of key code detection of media remote controls from various different manufacturers without complete prior knowledge and/or implementations of various different infrared signaling protocols employed in various media remote controls.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. At least one non-transitory computer readable storage medium comprising instructions that, when executed, cause at least one processor to at least:
   generate a query symbol alphabet based on a query optical pulse signature obtained from a meter that is to monitor presentation of media, the query optical pulse signature based on an optical pulse stream detected by the meter from a media remote control;
   apply a probability function to the query symbol alphabet and a reference symbol alphabet to determine a symbol alphabet matching probability;
   determine a symbol alphabet match based on the symbol alphabet matching probability; and
   determine a key code based on the symbol alphabet match.

2. The at least one non-transitory computer readable storage medium of claim 1, wherein the key code corresponds to a key activated on the media remote control, the activation of the key to generate the optical pulse stream.

3. The at least one non-transitory computer readable storage medium of claim 1, wherein the instructions, when executed, cause the at least one processor to:
   identify a key activated on the media remote control to control a media activity, the identification based on the key code; and
   identify media signature data based on a message obtained from the meter, the media signature data associated with the media activity.

4. The at least one non-transitory computer readable storage medium of claim 3, wherein the instructions, when executed, cause the at least one processor to:
   identify a query timestamp based on the message, the query timestamp based on the detection of the optical pulse stream;
   identify a media signature timestamp based on the message, the media signature timestamp based on the media activity; and
   associate the key code with at least one of the media signature data, the query timestamp, or the media signature timestamp.

5. The at least one non-transitory computer readable storage medium of claim 3, wherein the instructions, when executed, cause the at least one processor to determine that the media activity is at least one of an operational status of a television, a change in a media source, or a change of a television channel.

6. The at least one non-transitory computer readable storage medium of claim 1, wherein the optical pulse stream includes bursts of optical pulses having respective burst cycle periods between corresponding extremities of adjacent bursts, the bursts have respective burst durations, and the instructions, when executed cause the at least one processor to:
   generate a burst cycle period symbol threshold and a burst duration symbol threshold;
   quantize the respective burst cycle periods into corresponding quantized burst cycle periods based on the burst cycle period symbol threshold;
   quantize the respective burst durations into corresponding quantized burst durations based on the burst duration symbol threshold;
   cluster the quantized burst cycle periods into clustered burst cycle period data; and
   cluster the quantized burst durations into clustered burst duration data, the query symbol alphabet generated based on the clustered burst cycle period data and the clustered burst duration data.

7. The at least one non-transitory computer readable storage medium of claim 1, wherein the query optical pulse signature is based on a message from the meter, and the instructions, when executed, cause the at least one processor to:
   identify a query message size of the query optical pulse signature based on the message; and
   determine a message size match based on a comparison of the query message size of the query optical pulse signature with a reference message size of a reference optical pulse signature, the key code to be determined based on the message size match.

8. An apparatus comprising:
at least one storage device; and
at least one processor to execute computer readable instructions to at least:
generate a query symbol alphabet based on a query optical pulse signature obtained from a meter that is to monitor presentation of media, the query optical pulse signature based on an optical pulse stream detected by the meter from a media remote control;
apply a probability function to the query symbol alphabet and a reference symbol alphabet to determine a symbol alphabet matching probability;
determine a symbol alphabet match based on the symbol alphabet matching probability; and
determine a key code based on the symbol alphabet match.

9. The apparatus of claim 8, wherein the key code corresponds to a key activated on the media remote control, the activation of the key to generate the optical pulse stream.

10. The apparatus of claim 8, wherein the at least one processor is to:
identify a key activated on the media remote control to control a media activity, the identification based on the key code; and
identify media signature data based on a message obtained from the meter, the media signature data associated with the media activity.

11. The apparatus of claim 10, wherein the at least one processor is to:
identify a query timestamp based on the message, the query timestamp based on the detection of the optical pulse stream;
identify a media signature timestamp based on the message, the media signature timestamp based on the media activity; and
associate the key code with at least one of the media signature data, the query timestamp, or the media signature timestamp.

12. The apparatus of claim 10, wherein the at least one processor is to determine that the media activity is at least one of an operational status of a television, a change in a media source, or a change of a television channel.

13. The apparatus of claim 8, wherein the optical pulse stream includes bursts of optical pulses having respective burst cycle periods between corresponding extremities of adjacent bursts, the bursts have respective burst durations, and the at least one is processor to:
generate a burst cycle period symbol threshold and a burst duration symbol threshold;
quantize the respective burst cycle periods into corresponding quantized burst cycle periods based on the burst cycle period symbol threshold;
quantize the respective burst durations into corresponding quantized burst durations based on the burst duration symbol threshold;
cluster the quantized burst cycle periods into clustered burst cycle period data; and
cluster the quantized burst durations into clustered burst duration data, the query symbol alphabet generated based on the clustered burst cycle period data and the clustered burst duration data.

14. The apparatus of claim 8, wherein the query optical pulse signature is based on a message from the meter, and the at least one processor is to:
identify a query message size of the query optical pulse signature based on the message; and
determine a message size match based on a comparison of the query message size of the query optical pulse signature with a reference message size of a reference optical pulse signature, the key code to be determined based on the message size match.

15. A system comprising:
a meter to generate a query optical pulse signature; and
at least one server to:
generate a query symbol alphabet based on the query optical pulse signature obtained from the meter, the query optical pulse signature based on an optical pulse stream detected by the meter from a media remote control;
apply a probability function to the query symbol alphabet and a reference symbol alphabet to determine a symbol alphabet matching probability;
determine a symbol alphabet match based on the symbol alphabet matching probability; and
determine a key code based on the symbol alphabet match.

16. The system of claim 15, wherein the key code corresponds to a key activated on the media remote control, the activation of the key to generate the optical pulse stream.

17. The system of claim 15, wherein the at least one server is to:
identify a key activated on the media remote control to control a media activity, the identification based on the key code; and
identify media signature data based on a message obtained from the meter, the media signature data associated with the media activity.

18. The system of claim 17, wherein the at least one server is to:
identify a query timestamp based on the message, the query timestamp based on the detection of the optical pulse stream;
identify a media signature timestamp based on the message, the media signature timestamp based on the media activity; and
associate the key code with at least one of the media signature data, the query timestamp, or the media signature timestamp.

19. The system of claim 15, wherein the optical pulse stream includes bursts of optical pulses having respective burst cycle periods between corresponding extremities of adjacent bursts, and the bursts having respective burst durations, and the at least one server is to:
generate a burst cycle period symbol threshold and a burst duration symbol threshold;
quantize the respective burst cycle periods into corresponding quantized burst cycle periods based on the burst cycle period symbol threshold;
quantize the respective burst durations into corresponding quantized burst durations based on the burst duration symbol threshold;
cluster the quantized burst cycle periods into clustered burst cycle period data; and
cluster the quantized burst durations into clustered burst duration data, the query symbol alphabet generated based on the clustered burst cycle period data and the clustered burst duration data.

20. The system of claim 15, wherein the query optical pulse signature is based on a message from the meter, and the at least one server is to:
identify a query message size of the query optical pulse signature based on the message; and determine a message size match based on a comparison of the query message size of the query optical pulse signature with a reference message size of a reference optical pulse signature, the key code to be determined based on the message size match.

* * * * *

UNITED STATES PATENT AND TRADEMARK OFFICE
CERTIFICATE OF CORRECTION

| | | |
|---|---|---|
| PATENT NO. | : 11,564,008 B2 | Page 1 of 1 |
| APPLICATION NO. | : 17/144960 | |
| DATED | : January 24, 2023 | |
| INVENTOR(S) | : Matjaž Finc | |

It is certified that error appears in the above-identified patent and that said Letters Patent is hereby corrected as shown below:

In the Drawings

In block 156c of Figure 5B on drawing sheet 18 of 26, delete "Alpabet" and insert --Alphabet--.

Signed and Sealed this
Twenty-fifth Day of June, 2024

Katherine Kelly Vidal
*Director of the United States Patent and Trademark Office*